(12) United States Patent
Kim et al.

(10) Patent No.: US 10,136,428 B2
(45) Date of Patent: Nov. 20, 2018

(54) RESOURCE ALLOCATION METHOD FOR COMMUNICATION BETWEEN TRANSMITTING AND RECEIVING TERMINALS IN COMMUNICATION SYSTEM SUPPORTING DIRECT DEVICE-TO-DEVICE COMMUNICATION AND APPARATUS FOR SAME

(71) Applicant: LG ELECTRONICS INC., Seoul (KR)

(72) Inventors: Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 32 days.

(21) Appl. No.: 15/310,081

(22) PCT Filed: May 15, 2015

(86) PCT No.: PCT/KR2015/004900
§ 371 (c)(1),
(2) Date: Nov. 9, 2016

(87) PCT Pub. No.: WO2015/178630
PCT Pub. Date: Nov. 26, 2015

(65) Prior Publication Data
US 2017/0273077 A1 Sep. 21, 2017

Related U.S. Application Data

(60) Provisional application No. 62/001,628, filed on May 21, 2014.

(51) Int. Cl.
*H04W 72/14* (2009.01)
*H04W 72/04* (2009.01)
(Continued)

(52) U.S. Cl.
CPC ....... *H04W 72/0446* (2013.01); *H04W 72/14* (2013.01); *H04W 76/27* (2018.02); *H04W 88/02* (2013.01); *H04W 88/08* (2013.01)

(58) Field of Classification Search
CPC . H04W 72/0446; H04W 76/27; H04W 72/14; H04W 88/08; H04W 88/02
See application file for complete search history.

(56) References Cited

U.S. PATENT DOCUMENTS

| 2013/0070682 A1 | 3/2013 | Kim et al. | |
| 2015/0156757 A1* | 6/2015 | Kalhan | H04L 1/1607 370/330 |
| 2016/0112977 A1* | 4/2016 | Byun | H04W 56/0015 370/350 |

OTHER PUBLICATIONS

PCT International Application No. PCT/KR2015/004900, Written Opinion of the International Searching Authority dated Aug. 26, 2015, 18 pages.

(Continued)

*Primary Examiner* — Phuc Tran
(74) *Attorney, Agent, or Firm* — Lee Hong Degerman Kang Waimey

(57) ABSTRACT

The present specification relates to a method in which a base station efficiently notifies a transmitting terminal of a resource domain for transmitting control information and data in a wireless communication system supporting device-to-device (D2D) communication. To this end, the transmitting terminal receives resource allocation information associated with D2D communication from the base station, and transmits, to a receiving terminal, control information (SA) for D2D communication and data corresponding to the SA on the basis of the resource allocation information received from the base station, wherein a time domain location for transmitting the SA has a predetermined time domain pattern on the basis of the resource allocation information received (Continued)

from the base station, and a frequency domain location for transmitting the SA can be determined in advance by one of two specific hopping patterns.

16 Claims, 23 Drawing Sheets

(51) Int. Cl.
    *H04W 76/27*     (2018.01)
    *H04W 88/02*     (2009.01)
    *H04W 88/08*     (2009.01)

(56) References Cited

OTHER PUBLICATIONS

Samsung, "Mode 1 resource allocation for D2D broadcast communication", R1-141307, 3GPP TSG RAN WG1 Meeting #76bis, Mar. 22, 2014, 5 pages.
LG Electronics, "Operational procedure in Mode 1 for D2D communication", R1-142150, 3GPP TSG RAN WG1 Meeting #77, May 10, 2014, 2 pages.
Sharp, "Physical channel design for D2D SA and Data transmission", R1-142206, 3GPP TSG RAN WG1 Meeting #77, May 10, 2014, 6 pages.
Cea et al., "D2D physical channels and signals", R1-142295, 3GPP TSG RAN WG1 Meeting #77, May 9, 2014, 5 pages.
LG Electronics, "Operation in Mode 1 resource allocation for D2D communication", R1-141352, 3GPP TSG RAN WG1 Meeting #76bis, Mar. 22, 2014, 3 pages.
PCT International Application No. PCT/KR2015/004227, Notification of Transmittal of The International Search Report and The Written Opinion of The International Searching Authority, or Declaration dated Aug. 18, 2015, 12 pages.
Ericsson, "PDCP reordering for split bearer in dual connectivity", R2-142400, 3GPP TSG-RAN WG2 #86, May 9, 2014, 6 pages.
LG Electronics Inc. et al., "Introduction of Dual Connectivity in PDCP", R2-142692, 3GPP TSG-RAN WG2 #86, May 10, 2014, 24 pages.
Nvidia, "PDCP Reordering for DL Split Bearer", R2-142693, 3GPP TSG-RAN WG2 #86, May 10, 2014, 6 pages.
LG Electronics Inc., "Impacts of missing PDU on PDCP reordering", R2-142258, 3GPP TSG-RAN WG2 #86, May 10, 2014, 3 pages.

\* cited by examiner

FIG. 12

| CRC | PP | DM RS CS(3) | TPC(2) | NDI | MCS/RV (5/2) | N_UL_hop(1 or 2), resBlkAssign(x or y) | FH | DAI |

FIG. 26

| RB index | SA | Data |
|---|---|---|
| 1 | | |
| 2 | SA 1 | Data 1 |
| 3 | | |
| 4 | | |
| 5 | | |
| 6 | SA 2 | Data 2 |
| 7 | | |
| 8 | | |
| 9 | SA 3 | |
| 10 | | Data 3 |
| 11 | | |
| 12 | | |
| 13 | SA 4 | |
| 14 | | Data 4 |
| 15 | | |
| 16 | | |

```
PUSCH-ConfigCommon ::=      SEQUENCE {
    pusch-ConfigBasic           SEQUENCE {
        n-SB                        INTEGER (1..4),
        hoppingMode                 ENUMERATED (interSubFrame, intraAndInterSubFrame),
        pusch-HoppingOffset         INTEGER (0..98),
        enable64QAM                 BOOLEAN
    },
    ul-ReferenceSignalsPUSCH    UL-ReferenceSignalsPUSCH
}
```

RESOURCE ALLOCATION METHOD FOR COMMUNICATION BETWEEN TRANSMITTING AND RECEIVING TERMINALS IN COMMUNICATION SYSTEM SUPPORTING DIRECT DEVICE-TO-DEVICE COMMUNICATION AND APPARATUS FOR SAME

CROSS-REFERENCE TO RELATED APPLICATIONS

This application is the National Stage filing under 35 U.S.C. 371 of International Application No. PCT/KR2015/004900, filed on May 15, 2015, which claims the benefit of U.S. Provisional Application No. 62/001,628, filed on May 21, 2014, the contents of which are all hereby incorporated by reference herein in their entirety.

TECHNICAL FIELD

Following description relates to a method of allocating a resource for transmitting control information (SA) and data between a transmission UE and a reception UE in a wireless communication system supporting direct communication between terminals, i.e., D2D communication, and an apparatus therefor.

BACKGROUND ART

FIG. 1 is a diagram for explaining a concept of direct communication between terminals to which the present invention is applicable.

A general communication scheme is served by an eNB for a plurality of user equipments (UEs). On the contrary, according to a D2D communication scheme, as shown in FIG. 1, if a resource for D2D communication is allocated, direct communication can be performed between a UE 1 and a UE 2.

When a UE performs communication with a different UE using a direct radio channel, it may be able to use a discovery signal as a method of discovering a counterpart UE of the communication. In this case, although the UE corresponds to a terminal of a user, if such a network device as an eNB transmits and receives a signal according to a communication scheme between UEs, the network device can also regarded as a sort of UEs.

In the following, a directly connected link between UEs is referred to as a D2D link and a link used for a UE to perform communication with an eNB is referred to as an eNB-UE link.

DISCLOSURE OF THE INVENTION

Technical Task

Information on a radio resource, which is allocated for D2D communication, is firstly received from a base station and used. Yet, a transmission UE (Tx UE) should transmit data and control information for the data to a reception UE (Rx UE) within the resource allocated by the base station.

If an Rx UE receives all blind decoding from a resource predetermined by a base station, such a problem as unnecessary battery consumption of a UE may occur.

The present invention intends to provide a method for a Tx UE to efficiently utilize a resource for transmitting control information and data to an Rx UE and an apparatus therefor.

Technical Solution

To achieve these and other advantages and in accordance with the purpose of the present invention, as embodied and broadly described, according to one embodiment, a method of transmitting a signal, which is transmitted by a transmission user equipment (Tx UE) to a reception user equipment (Rx UE) in a wireless communication system supporting device-to-device (D2D) communication, includes the steps of receiving resource allocation information related to the D2D communication from an eNB and transmitting control information (SA) for the D2D communication and data corresponding to the SA to the Rx UE based on the resource allocation information received from the eNB. In this case, a time domain location at which the SA is transmitted includes a prescribed time domain pattern based on the resource allocation information received from the eNB, a frequency domain location at which the SA is transmitted is determined in advance by (1) a first type hopping pattern determined by $N^{UL}_{RB} - N^{HO} - (N^{UL}_{RB} \mod 2)$ or (2) a second type hopping pattern determined by $N^{UL}_{RB} - N^{HO}$ or $N^{UL}_{RB}$, the $N^{UL}_{RB}$ may correspond to the number of frequency domain resource blocks capable of being used for transmitting the SA, and the $N^{HO}$ may correspond to a first hopping parameter.

In this case, a hopping pattern of the frequency domain location at which the SA is transmitted can be changed in every subframe corresponding to a transmission opportunity according to the prescribed time domain pattern.

And, the $N^{UL}_{RB}$ can be determined according to at least one UE attribute of the Tx UE and the Rx UE. In this case, the UE attribute can be determined based on at least one selected from the group consisting of a TA (timing advance) value, a cell size, transmit power, and a service type of a corresponding UE.

Meanwhile, the method can further include the step of receiving RRC signaling from the eNB. In this case, the $N^{HO}$ can be determined based on a value received by the RRC signaling received from the eNB.

And, a method of determining the frequency domain location at which the SA is transmitted, which includes an index assigning method for determining whether to apply the first type hopping pattern or the second type hopping pattern and whether to apply mirroring and hopping to a frequency domain, can be differently determined according to at least one UE attribute of the Tx UE and the Rx UE.

And, a frequency domain location at which the data corresponding to the SA is transmitted can be determined according to a predetermined rule based on the frequency domain location at which the SA is transmitted. As a concrete example, if an index of a resource block in the frequency domain at which the SA is transmitted corresponds to a first RB index and an index of a resource block in the frequency domain at which the data corresponding to the SA is transmitted corresponds to a second RB index, the second RB index may correspond to an integer multiple of the first RB index.

To further achieve these and other advantages and in accordance with the purpose of the present invention, according to a different embodiment, a transmission UE (Tx UE, D2D UE) operating in a wireless communication system supporting device-to-device (D2D) communication includes a transceiver configured to receive resource allocation information related to the D2D communication from an eNB, the transceiver configured to transmit control information (SA) for the D2D communication and data corresponding to the SA to a reception user equipment (Rx UE), and a processor configured to control the transceiver to transmit the SA and the data based on the resource allocation information received through the transceiver. In this case, the processor is configured to determine a frequency domain location at which the SA is transmitted in advance by (1) a first type hopping pattern determined by $N^{UL}_{RB}\text{-}N^{HO}\text{-}(N^{UL}_{RB} \bmod 2)$ or (2) a second type hopping pattern determined by $N^{UL}_{RB}\text{-}N^{HO}$ or $N^{UL}_{RB}$, the $N^{UL}_{RB}$ may correspond to the number of frequency domain resource blocks capable of being used for transmitting the SA, and the $N^{HO}$ may correspond to a first hopping parameter.

The processor can be configured to change a hopping pattern of the frequency domain location at which the SA is transmitted in every subframe corresponding to a transmission opportunity according to the prescribed time domain pattern.

And, the processor controls the transceiver to further receive RRC signaling from the eNB. In this case, the $N^{HO}$ can be determined based on a value received by the RRC signaling received from the eNB.

Advantageous Effects

According to the present invention, an Rx UE is able to efficiently recognize a resource in which control information and data are transmitted by a Tx UE, thereby enhancing D2D communication performance.

DESCRIPTION OF DRAWINGS

Unlike FIG. 3.

FIG. 12 is a diagram for a DCI format 0 in a LTE system;

FIG. 26 is a diagram for a case of not configuring a resource gap between data RBs while a resource gap is configured between SA RBs according to one embodiment of the present invention;

BEST MODE

Mode for Invention

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As mentioned in the foregoing description, following description relates to a method of allocating a resource for transmitting control information (SA) and data between a transmission UE and a reception UE in a wireless communication system supporting D2D communication and an apparatus therefor. To this end, first of all, a system supporting D2D to which the present invention is applied is explained in detail.

<Overall Processes of D2D Communication>

Overall eNB-to-D2D Tx (and/or Rx) UE scheduling for D2D transmission can be classified as follows.

Figure 1:
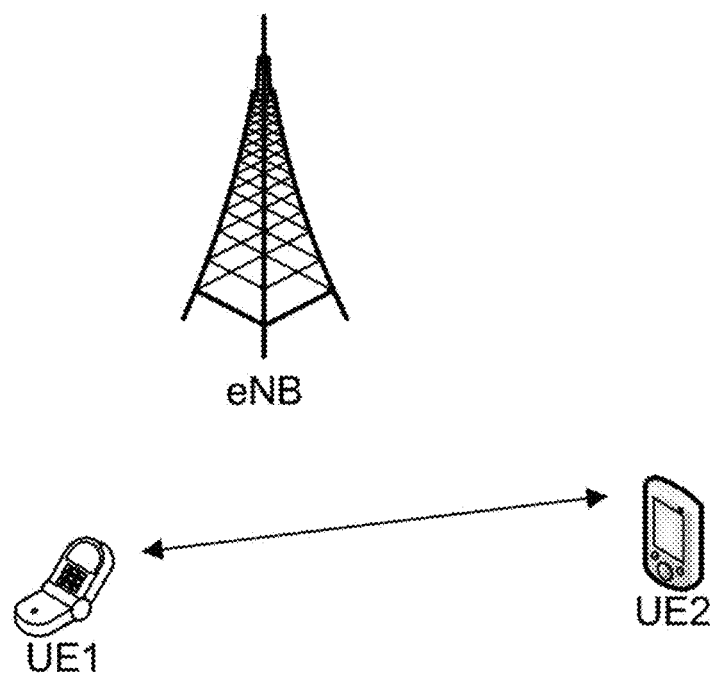
FIG. 1 is a diagram for explaining a concept of direct communication between UEs to which the preset invention is applicable.
Figure 2:
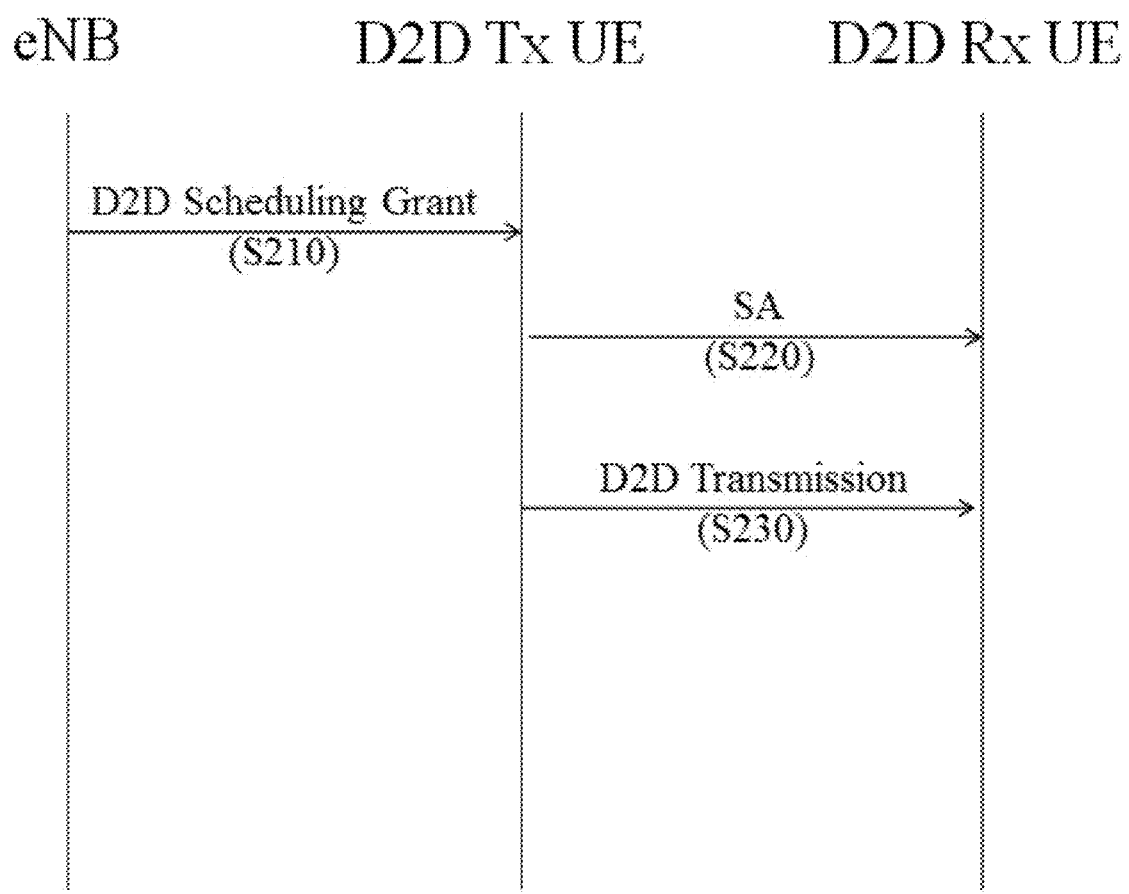
FIG. 2 is a flowchart for explaining an overall process of D2D communication to which the present invention is to be applied.

FIG. 2 is a flowchart for explaining an overall process of D2D communication to which the present invention is to be applied.

As shown in FIG. 2, a D2D Tx UE can receive a scheduling grant from an eNB [S210] and this step is explained as an eNB scheduling grant procedure in the following. In FIG. 2, although it is depicted as a scheduling grant is transmitted to the Tx UE from the eNB, the Rx UE can receive the same information from the eNB as well.

In the step S210, two methods are proposed. A method #1 corresponds to a method of allocating a resource via an RRC signal and the method of controlling a detail dynamic operation such as an operation of activating/releasing a resource via a physical/MAC control channel (e.g., PDCCH). On the contrary, a method #2 corresponds to a method of controlling a D2D operation such as resource allocation and/or scheduling information via a physical/MAC control channel.

In the aforementioned two methods, although it is able to determine scheduling information (e.g., MCS, RV, DM RS parameters, etc.) in a manner of receiving the information from the eNB, a UE can autonomously determine the scheduling information as well. When the scheduling information is received from the eNB, if the method #1 is used, the information can be delivered via an RRC signal form or a control channel form such as PDCCH. If the information is delivered via the RRC signal form, since it is not necessary to include such a field as MCS, RV, DM RS parameter, etc. in a DCI format of PDCCH, it may be able to reduce a length of the DCI format by removing the field from the DCI format. Or, it may be able to perform transmission using a DCI format of an identical length by applying a technology such as zero padding or the like to the DCI format.

Since the method #2 does not have an RRC signal, it is difficult to apply the above-mentioned technology.

If a UE autonomously determines the scheduling information (MCS, RV, etc.), a corresponding contents field of PDCCH is not necessary in the method #1 or the method #2. In this case, it may be able to remove the contents field or it may be able to apply a zero padding method to a field not in use.

Method #1—RRC Signal and Dynamic Control Signal (e.g. (E)PDCCH, PHICH) Based Scheduling (e.g. Semi-Static Scheduling) for SA (and Data)

As a first detail procedure for the method #1, a D2D Tx UE can receive an RRC signal from an eNB and the RRC signaling can include resource allocation information for overall resource configuration/SA (and data).

Similar to LTE SPS scheduling, the eNB can allocate a specific resource (or a specific resource set/group) via the RRC signal. The specific resource is allocated for D2D transmission.

The eNB is able to allocate a monitoring resource for D2D reception using a similar method. The eNB monitors a specific resource region (e.g., subframe(s), a set of resource blocks) and may be then able to perform blind demodulation on data. In this case, the monitoring resource may correspond to a resource to be monitored to perform blind decoding on SA (Tx-to-Rx for D2D), a resource to be monitored to receive data, or both of the resources.

As a second detail procedure, the eNB can transmit a dynamic control signal to the UE and the dynamic control signal may indicate activation/deactivation of an allocated resource.

The second detail procedure corresponds to a method of indicating activation or deactivation of an allocated resource via RRC using EPDCCH, PDCCH, PHICH, or a new channel. In case of using the PHICH, it may be able to reserve a separate PHICH resource (index) to indicate activation or deactivation of an allocated resource. Or, it may be able to utilize a resource index used for allocating a D2D resource to determine a PHICH resource (resource index linkage). In particular, a PHICH resource index is determined by combining uplink resource allocation information (index) and an additional parameter with each other by utilizing a characteristic of D2D using an uplink resource. When a D2D resource index (virtual index) is used, other parameters except the D2D resource index can be configured to be identical to LTE.

If a concrete resource is not designated by an RRC signal and a resource is allocated in such a form as a resource group or a range, it may be able to deliver a precise resource location and a transmission parameter by utilizing a dynamic control signal of the present detail procedure. It may be able to use EPDCCH, PDCCH, PHICH or the like as a channel on which the resource location and the transmission parameter are delivered. This operation can be used not only for SA scheduling but also for indicating a data resource region, i.e., data scheduling.

An example of the operation is explained in the following.

As a concrete example of the operation, a method of indicating a time location of an SA resource and/or a data resource is explained. In general, a D2D subframe transmitted by a UE becomes a part of overall UL subframes. The remaining UL subframes are used for performing communication with an eNB. Meanwhile, if a UE transmits a D2D signal in a specific UL subframe, it is difficult for the UE to receive a D2D signal of a different UE on an identical band of the specific subframe. This is because the signal transmitted by the UE acts as strong interference.

A subframe pattern in which a D2D signal is transmitted and a subframe pattern in which a D2D signal is received can be differently configured in the aspect of a UE. As a method of reducing mutual interference by reducing frequency of using a time resource overlapped with each other used by two adjacent UEs and solving the aforementioned problem, UEs different from each other can differently configure a pattern of a subframe in which a D2D signal is transmitted. In particular, the problem can be solved in a manner that an eNB appropriately designates a subframe pattern to be used for D2D transmission in consideration of a distance between the UEs (by identifying the extent of the mutual interference).

Of course, if the subframe pattern is dynamically designated via EPDCCH or PDCCH, it is able to promptly correspond to a location change of a UE. Yet, there are many limitations in designating various subframe patterns using the restricted number of transmission bits of the EPDCCH or the PDCCH. As a method of reducing signaling burden, it is able to make a UE autonomously select a subframe pattern instead of a subframe pattern determined and indicated by an eNB. A UE can select a subframe pattern using a pseudo-random scheme based on a UE ID of the UE (or, a UE-specific parameter including a similar characteristic). Or, the UE receives minimum signaling information from an eNB and uses the signaling information as a factor for determining a pseudo-random value. As a result, a subframe pattern can be pseudo-randomly selected. If an appropriate subframe set is provided and a pattern is randomly selected from the subframe set, it may be able to solve the problem caused by the aforementioned interference.

To this end, an eNB delivers candidates of subframe patterns capable of being potentially used to a specific UE via a higher layer signal such as RRC and may be able to designate a subframe pattern to be practically used for transmission at specific timing via EPDCCH or PDCCH.

Figure 3:
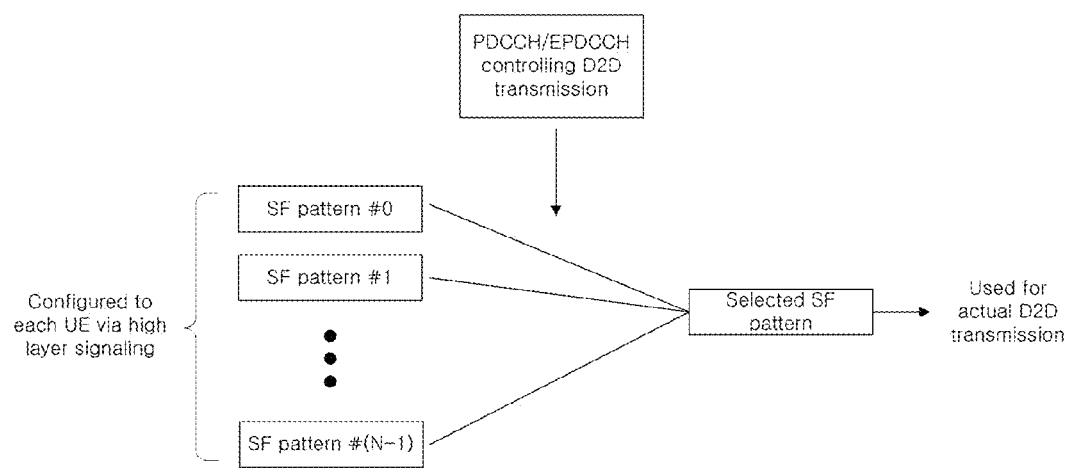
FIG. 3 is a diagram for explaining a method of selecting a specific subframe pattern via a dynamic control channel after a plurality of subframe patterns (SFs) are designated via a higher layer signal.

FIG. 3 is a diagram for explaining a method of selecting a specific subframe pattern via a dynamic control channel after a plurality of subframe patterns (SFs) are designated via a higher layer signal.

In particular, as mentioned in the foregoing description, referring to FIG. 3, N numbers of subframes are assigned in advance via a higher layer signal and an eNB designates a pattern to be used for D2D transmission by selecting one subframe from the N number of subframes using PDCCH or EPDCCH. In the course of assigning the N number of subframe patterns in advance, the eNB can designate a form of a subframe pattern practically applied to a subframe pattern # k. for example, the eNB can assign a subframe pattern in a bitmap form of a subframe which is repeated with a prescribed period.

Figure 4:
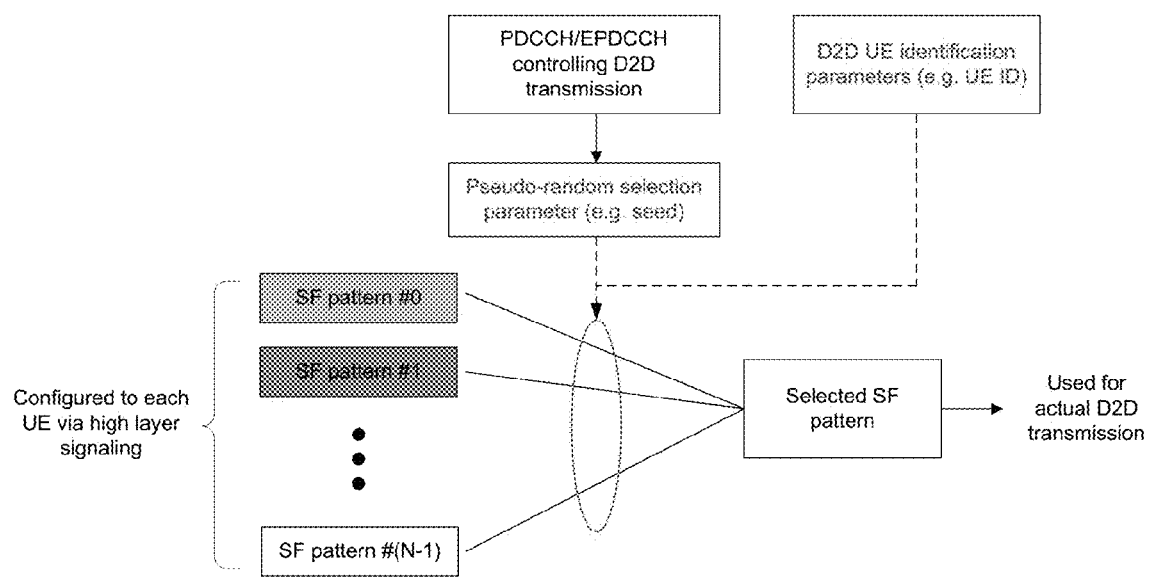
FIG. 4 is a diagram for explaining a method of implicitly indicating a subframe pattern.

Unlike FIG. 3, FIG. 4 is a diagram for explaining a method of implicitly indicating a subframe pattern.

Specifically, configuring a plurality of SF patterns via a higher later signal is identical to that of FIG. 3. Yet, according to the present example, it may be able to provide a seed value for performing pseudo-random selection only among a plurality of the SF patterns instead of indicating an SF pattern to be explicitly used via PDCCH/EPDCCH. And, it may be able to configure an SF pattern to be selected using unique information of a D2D UE (e.g., an ID of the D2D UE, and the like) without utilizing the aforementioned control channel.

Figure 5:
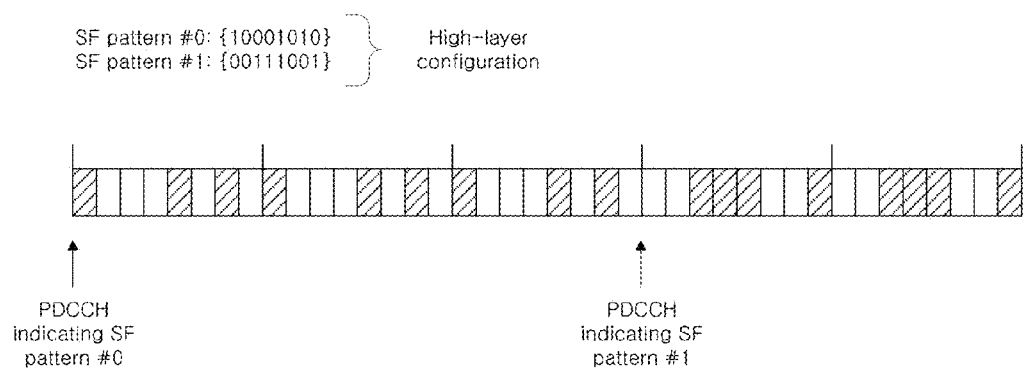
FIGS. 5 and 6 are diagrams for explaining an operation of a UE that changes a subframe pattern.
Figure 6:
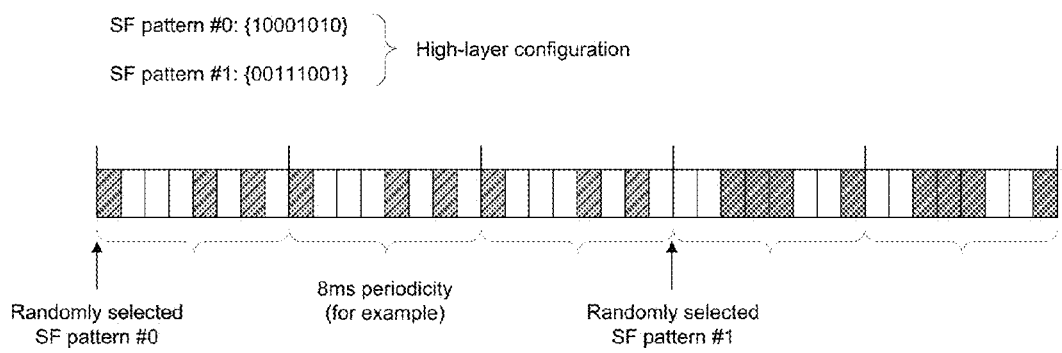

FIGS. 5 and 6 are diagrams for explaining an operation of a UE that changes a subframe pattern.

Specifically, FIG. 5 shows a case of using an explicit SF pattern indication scheme and FIG. 6 shows a case of using an implicit SF pattern indication scheme. In this case, assume that a subframe pattern is repeated with a period of 8 ms and {10001010} and {00111001} are assigned to a subframe pattern #0 and a subframe pattern #1, respectively, via a higher layer signal in advance.

An eNB designates a subframe pattern to be practically used by a UE via PDCCH and the subframe pattern can provide information for selecting the explicit SF pattern in FIG. 5 and information for selecting the implicit SF pattern in FIG. 6. The UE can perform a D2D operation according to the information.

In order to perform the operation, it is necessary to designate a subframe pattern to be used using a partial field of PDCCH or EPDCCH. As mentioned in the foregoing description, if DCI for a legacy UL grant is reused as DCI for D2D, an unnecessary field exists. The field can be utilized as a subframe pattern indicator. The field can include a DCI format 0/1A indicator, a CQI request field, an NDI field, and the like. It may also be able to use a part of a DM RS cyclic shift field or an MCS/RV field using a plurality of bits.

If a resource for transmitting scheduling assignment and a resource for transmitting a D2D data are designated to a UE at the same time via a single PDCCH or EPDCCH, a subframe pattern for the scheduling assignment and a subframe pattern for the D2D data can be respectively assigned to each state designated by the field of the aforementioned DCI. Or, when a pattern is pseudo-randomly selected, it may be able to deliver a parameter or a seed value determining a pseudo-random value. It may also be able to determine a subframe index by a pseudo-random value without a pattern. In this case, it may also be able to deliver a parameter or a seed value determining the pseudo-random value. Although a subframe pattern or a subframe index can be determined based on signaling information for determining the pseudo-random value only, the subframe pattern or the subframe index can also be determined by combining the signaling information and a unique value of a UE with each other.

Similar to semi-persistent scheduling, the aforementioned method allocates a resource via RRC and can implement an operation of dynamically using or cancelling a resource through a physical layer and a MAC layer control channel.

Method #2—(E)PDCCH Based Scheduling (Dynamic Scheduling)

This method corresponds to a method of indicating not only resource allocation but also MCS, RV, NDI, power control, PMI and the like for data demodulation to a D2D Tx UE (and/or a D2D Rx UE) using a control information delivering channel (e.g., EPDCCH, PDCCH, PHICH, or new channel) in a physical layer (or including a MAC layer) instead of resource allocation via RRC.

The usage of an SG (scheduling grant) can be defined in various ways as well as the aforementioned function. As a representative usage, the SG can be used for the usage of indicating a fact that contents of scheduling information has changed. In this case, the usage can be divided into a case of maintaining a signaling format identical to the SG and a case of using a different signaling format. The scheduling information may indicate a change of a resource region designated by an RRC signal, a change of a resource to be used by a D2D Tx UE (and/or a D2D RX UE) in the designated resource region, a change of a resource region practically allocated by the SG a change of a resource region group, or a change of all or a part of SA contents.

The SA contents include various scheduling information including an RA. If one or more contents of the SA contents are changed, the change can be indicated by the SG. In this case, it may be able to use an SG of a compact form in a manner of reducing a bit field of the SG It may be able to implement SG/SA update (e.g., resource re-allocation) via not only PDCCH and EPDCCH but also PHICH. A PHICH resource can be used for the purpose of indicating whether or not there is a modification in SG/SA. If there is a modification in the SG/SA, it is able to receive a modified content by monitoring the SG/SA. In particular, SG/SA modification notification is designated in advance and it is able to receive a modified SG/SA after time at which the SG/SA modification notification is designated or during a designated time section.

The modification notification has two meanings. One meaning is to monitor and receive SG to identify a modified content by notifying a fact that it is necessary to modify SA. Another meaning is to receive a modified SG (at a prescribed timing) because the SG has changed or the SG is expected to be changed. As mentioned in the foregoing description, the usage of the SG can be used not only for SA but also for data scheduling.

Referring back to FIG. 2, as mentioned in the foregoing description, having received the D2D scheduling grant from the eNB, the Tx UE can transmit control information, i.e., SA, to perform D2D communication with the Rx UE [S220]. The step S220 is explained as a scheduling operation between the Tx UE and the Rx UE in the following description.

In order to transmit the SA, the scheduling operation can be used together with the methods mentioned earlier in the step S210.

Examples of information capable of being included in the SA are described in the following (resource-related information for reception).

(1) Information related to resource for data reception
(2) RB allocation
(3) Number of patterns for retransmission (4) Frequency hopping pattern
(5) SPS of data (including periodicity)
(6) Target ID
(7) MCS/RV of data
(8) Timing advance of data Meanwhile, after the SG is received via the step S210, timing at which the SA is transmitted can be determined as follows.

It may be able to induce SA transmission by receiving the SG in a subframe n−k1 (k1 is an integer) under an assumption that a D2D Tx UE is aware of a subframe in which the SA transmission is available. Since an eNB identifies the subframe in which the SA transmission is available and transmits the SG in accordance with the subframe, there may exist a restriction in transmitting the SG. When a receiver processing capability of a UE is considered in LTE system, a value of the K1 may become around 4. According to the technological progress, it is able to sufficiently configure the K1 value by 2 or 3.

Having received the SG, the UE is able to identify a location of a subframe in which data is transmitted at the same time. In particular, the usage of the SG may include not only SA scheduling but also data transmission. Hence, the SG can include data transmission timing (subframe), frequency resource allocation, and the like.

Meanwhile, it may be able to perform a method of transmitting SA in a resource in which SA transmission is valid at the time that the SG is received and then prescribed time elapses. According to the method, an eNB does not identify the subframe in which the SA transmission is valid in detail and transmits the SG based on timing at which a D2D transmission resource is requested.

If the SG is received, an available subframe capable of generating and transmitting SA is identified based on the SG and the SA is transmitted to an available or valid D2D subframe (a valid subframe in terms of SA transmission). Although the SG is received and a next subframe is available, it is unable to immediately transmit the SA. In order to receive and process the SG generate relevant information as the SA, and prepare to transmit data, n+k2 is required (in this case, the k2 is an integer). According to the technological progress, it is able to configure the K2 by 2 or 3. According to reception capability of a UE, the k2 may have various values including 1, 2, 3, 4, or the like.

If the k2 corresponds to 4, the SA is transmitted after 4 subframes from the timing of receiving the SG. If an available subframe does not exist immediately after the 4 subframes, the SA is transmitted in a next subframe. If an available subframe does not exist again, the SA is transmitted in a next subframe. This rule can be comprehended as a fastest subframe appearing after the n+4.

In this case, a subframe in which transmission is unavailable may correspond to all subframes not designated as a D2D transmission subframe. Or, such a subframe in which a synchronization signal is transmitted as 0 and 5 can be excluded from the available subframe. Or, such a subframe in which a paging signal is transmitted as 0, 4, 5, and 9 can be excluded from the available subframe.

In this case, although a subframe is designated as a D2D subframe, if a channel (a channel similar to the WAN synchronization signal, BCH channel) on which D2D essential information is carried is set to the D2D subframe, the subframe can be excluded from the available subframe in which the SA is transmitted. Or, it may be able to configure an SA transmission-dedicated subframe and the SA can be transmitted in the subframe only. After the SG is received, the SA is transmitted in the available subframe in which the SA is transmitted after a subframe n+k3.

Having received the SG the UE is able to identify a location of a subframe in which data is transmitted at the same time. In particular, the usage of the SG may include not only SA scheduling but also data transmission. Hence, the SG can include data transmission timing (subframe), frequency resource allocation, and the like.

Referring back to FIG. 2, as mentioned in the foregoing description, having transmitted the SA, the Tx UE can transmit data to the Rx UE in response to the aforementioned SA [S230]. In general, D2D communication corresponds to the aforementioned communication.

Although it is not depicted in FIG. 2, an SG HARQ procedure for D2D communication is explained in the following.

If the D2D UE receives the SG in the step S210, the D2D UE may send a response to the eNB in response to the SG. In this case, as mentioned in the foregoing description, the SG may correspond to control information such as SPS activation/deactivation, resource allocation (scheduling information) control information, or the like.

If it fails to receive the SG since it is unable to perform following SA transmission or unable to apply a modified item for a previously transmitted SA content, SA prior to a modification is consistently transmitted. As a result, it may cause performance deterioration or a situation that communication is unavailable.

Hence, it may be necessary to have confirmation for SG transmission. In order to have the confirmation for the SG transmission, it may be able to utilize a UL ACK/NACK mechanism. In particular, it may be able to send acknowledgement using a legacy PUCCH structure or an embedded PUCCH to PUSCH form in response to the SG. If the SG follows a PDCCH/EPDCCH format or a mechanism, it is able to secure a PUCCH resource connected to each DCI index. Hence, it is able to easily utilize the PUCCH resource for making a response to the SG In this case, if contents included in the SG are received in a manner of being divided into SA and data and if it is able to identify whether or not an error occurs in a manner of dividing the contents into the SA and the data, it is able to make a feedback on information at which an error occurs among SA scheduling information and data scheduling information. Since an error occurs on one of the information or both of the information, it is necessary to determine a response bit for both cases. 1 or 2 bits can be sufficient enough for the response bit. Feedback information can be delivered by utilizing a PUCCH channel.

When an SG2 is transmitted after an SG1 is transmitted, if a UE receives the SG2, the UE determines that the SG1 is not valid anymore. Timing at which the validity is determined is applied after a subframe n+k4 from the timing at which the SG2 is received. In this case, the k4 is an integer and the k4 is determined in consideration of timing at which the SG2 is practically applicable. For example, 2, 3, and 4 may correspond to a typical value of the k4.

The SG1 and the SG2 can be transmitted at the same time. Or, the SG1 and the SG2 can be transmitted in a manner of being aggregated into a single DCI format. In case of performing a separate coding, a receiving end may have a separate success rate. It may be preferable for a UE to feedback a result of the transmission to an eNB. To this end, the aforementioned PUCCH structure may be appropriated for the feedback.

D2D transmit power control can be implemented via the SG. In particular, it may be able to deliver a TPC command by utilizing a TPC field or a DCI format 3/3A. In case of using the 3/3A, a specific field of the 3/3A can be used as a D2D power control by reserving the specific field. A usage of the specific field should be partitioned in advance via RRC signaling.

The SG can be implemented in a manner of determining valid time. In particular, if prescribed time elapses after the SG is received, if prescribed numbers of subframes are passed, or if prescribed numbers of D2D subframes are passed, the SG is automatically invalidated. Similarly, it may use a timer. If prescribed time elapses, the timer is expired and the SG is considered as invalid. Or, it may be able to simply define that the SG is valid until a next SG is received. Or, two methods can be applied at the same time. For example, when prescribed time or prescribed number of subframes elapses, the SG is invalidated. In this case, if an SG is received before the prescribed time or the prescribed number of subframes elapses, a previous SG is invalidated.

<Transmission of D2D SA and Data>

When D2D communication is performed, D2D control information required for demodulating D2D data can be transmitted via a channel (or a signal) separated from a D2D communication channel on which data is transmitted. And, when control information necessary for delivering a D2D discovery message is separately transmitted, it is also able to apply an operation proposed in the following.

The D2D control information can include all or a part of information including an NDI (new data indicator), an RA (resource allocation or configuration), an MCS (modulation and coding scheme/set), an RV (redundancy version), and a Tx UE ID. It is able to differently configure a combination of control information components according to a scenario to which D2D communication is applied.

In general, since control information (CI) is utilized for demodulating a data channel, the control information should be decoded prior to the data channel. Hence, it is necessary to know locations of a time and a frequency resource to which the control information is transmitted and relevant parameters required for performing the demodulation in advance. For example, in case of an LTE PDCCH, in order to make a specific location to which control information is transmitted to be known among specific symbols of every subframe, a transmitting end and a receiving end commonly use a UE ID-based hashing function. In case of an LTE BCH, an eNB and a UE share a fact that system information is delivered to a specific symbol of a specific SF with a period of 40 ms with each other.

As mentioned in the foregoing description, it is necessary to deliver sufficient demodulation-related information (parameter) to a UE in advance to acquire control information.

In order to guarantee successful demodulation of D2D control information, a transmission-related parameter (e.g., a subframe/slot index, a symbol index, and an RB index) should be shared with a UE. For example, the D2D control information can be configured to be transmitted in all subframes designated as a D2D subframe (a subframe designated to perform D2D transmission), a subframe set including a specific index, or a subframe set of a specific period. A potential CI transmission subframe or a subframe set should be recognized by a UE in advance via signaling or UE-specific information.

It is able to configure a resource region to which a D2D data channel is delivered to be different from a resource region to which D2D control information is delivered in time domain. In particular, the D2D control information is periodically transmitted in a unit of designated time (or, while hopping with a designated time-frequency domain pattern), whereas the D2D data is delivered to a resource region indicated by the control information only. Unlike a scheme of transmitting control and data by binding the control and the data with each other, this indicates that an instance transmitting the control and an instance transmitting the data are independently managed. When the control and the data are transmitted in a manner of being separated from each other, it may be able to independently configure a parameter (scrambling, CRC, CRC masking, demodulation sequence generation parameter, etc.) applied to the control and the data. Or, it may be able to indicate a parameter applied to the data through control information. In the latter case, since monitoring & decoding are attempted in a potential resource to which the control information is transmitted using a potential parameter (e.g., explicit or blind decoding) and it is not necessary to perform decoding attempt in the rest of resource regions, it is useful for reducing power consumption.

Moreover, in case of demodulating data, since designated information is demodulated only at designated timing by utilizing a parameter indicated by the control information and resource region information, it may be able to reduce power consumption.

As an example for implementing the above-mentioned method, a plurality of UEs perform blind searching on a specific resource region at specific timing to obtain control information and control information matched with each UE is decoded. Whether or not the control information is matched with each UE can be implemented based on UE-specific information or UE-group specific (UE-group common). It may apply UE-group common scrambling or CRC masking to make a UE perform (blind) decoding only or make a plurality of UEs (a group or all UEs) perform decoding by applying UE-specific scrambling or CRC masking to D2D control information.

A UE or a UE group can obtain information related to data demodulation from control information which has succeeded in decoding. In this case, the control information includes not only explicit information included in the control information but also a parameter (a predetermined parameter and a parameter obtained from a given set via blind search) (e.g., scrambling, CRC masking, use resource information, reference signal related parameters, etc.). Hence, it may be able to configure blind decoding not to be performed on data.

In order to obtain control information, a UE or a UE group performs blind decoding on control information using a specific parameter at specific timing by utilizing unique information or information signaled in advance and obtains scheduling information related to data demodulation and various parameters used for generating and transmitting a control channel. The control channel related parameter and the decoded scheduling information (resource allocation information necessary for demodulating data of a UE and explicit information such as NDI, MCS, Tx UE ID) are used for decoding and demodulating a data channel.

Since a parameter obtained by performing blind search is used for a control channel as it is or a new parameter generated based on the parameter is used for generating a data channel, it is not necessary to perform parameter blind search on the data channel.

It may be able to differently configure a period of a control channel and a period of a data channel in time to make two information to be transmitted in an identical subframe (in terms of a UE or a UE-group). In particular, blind decoding is performed on a control channel in a specific subframe and data of the identical subframe is demodulated based on the information. In this case, blind decoding is performed on the control channel only while blind decoding is not performed on data. By doing so, it may be able to make blind decoding complexity depend on the control channel only in the subframe.

In particular, blind decoding is performed on control information in the subframe. When blind decoding is performed on data, if control and data are transmitted together in an identical subframe, blind decoding trial is rapidly increasing. Hence, the number of UEs capable of being detected in a specific subframe through blind decoding can be restricted. In particular, if a transmission period of control, a transmission period of data and the like are fixed, the control and the data can be transmitted together in an identical subframe in some cases according to a mutual period. If there exists a blind decoding trial restriction in a subframe, it may face a situation of reducing a control and/or data channel blind decoding trial.

In order to reduce the aforementioned problem, it may be able to prevent a decoding trial limitation caused by variation of decoding complexity in a manner of introducing blind decoding to a control channel only. Meanwhile, the degree of scheduling freedom for a data channel is increasing. In particular, when a control channel and a data channel are located at an identical subframe, since there is no decoding complexity limitation, although the control channel is periodically transmitted in a specific subframe, it is not necessary to avoid a subframe in which the control channel is transmitted when a subframe in which the data channel is to be transmitted is determined.

If a control channel is detected once and transmission of data related to the control channel is transmitted in a specific subframe, it is not necessary to transmit control information in a control channel transmission opportunity subframe (control channel transmission period) during a time section until a subframe in which data is to be transmitted. Similarly, it is able to additionally configure control channel blind decoding (monitoring) not to be performed until a data subframe in which a control channel is decoded and the data subframe indicated by control information in the aspect of a UE. By doing so, it may be able to reduce power consumption. The above-mentioned configuration can be differently configured according to a UE.

Since it is able to differently configure a period of transmitting a control channel and a subframe offset according to a UE, it is able to know a subframe in which monitoring is not performed according to a UE. In particular, if a UE decodes control information in a specific subframe, the UE is able to know DRX performing duration in consideration of a period of control information monitoring subframe of the UE and an offset. If the UE receives and modulates control information (i.e., scheduling assignment), the UE is able to calculate the duration of not performing control information monitoring (DRX) by appropriately utilizing a specific bit value, control information subframe period information, and the like carried on a subframe index, a UE ID, and the control information.

Figure 7:
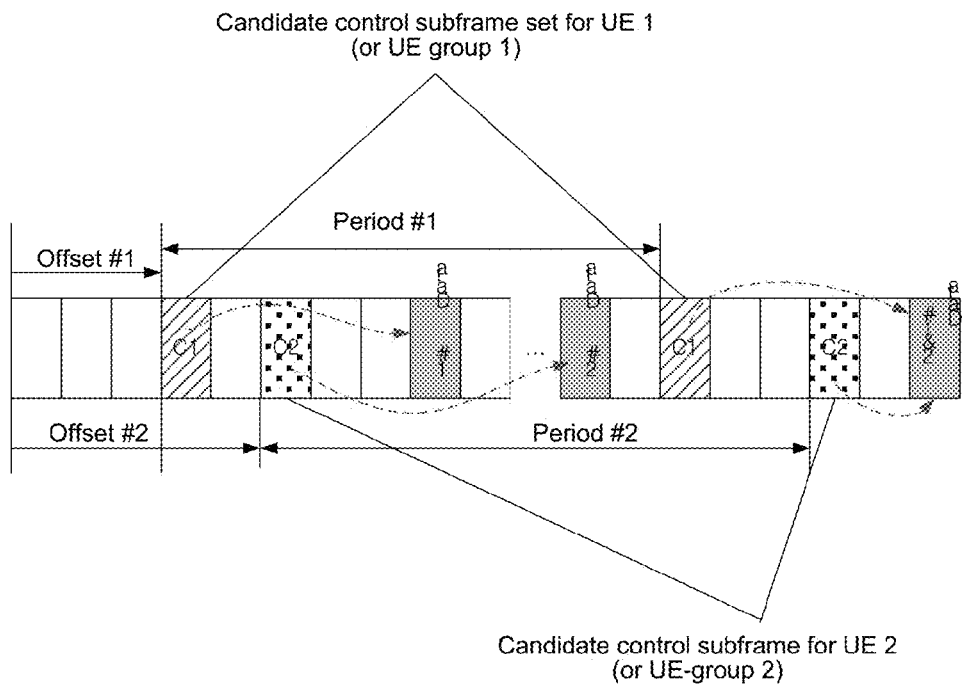
FIG. 7 is a diagram for a method of allocating a resource by applying a different period or an offset to a different UE or a UE group.

FIG. 7 is a diagram for a method of allocating a resource by applying a different period or an offset to a different UE or a UE group.

In FIG. 7, a resource used for transmitting control information is represented as C1 among resources allocated to a UE1 (or a UE-group 1) (it is able to know the resource by (E-)PDCCH, SIB, preconfigured, relaying by UE, etc.). A period of the C1 resource corresponds to a period #1.

Similarly, a resource used for transmitting control information of a UE2 (or a UE-group 2) including a period #2 is represented as C2.

First of all, C1 information corresponds to a parameter related to transmission of Data #1. The parameter corresponds to various informations (e.g., scheduling information such as a DM RS sequence, MCS, RA, and the like) necessary for an Rx UE. C2 information corresponds to a parameter related to transmission of Data #2. The parameter corresponds to various informations (e.g., scheduling information) necessary for demodulating the Rx UE. Secondly, the C1 and the C1 represent parameters associated with the Data #1 and the Data #2 and information related to scheduling information.

Since a UE is aware of a location of a subframe to be monitored by the UE in advance, the UE performs blind decoding on the subframe.

Figure 8:
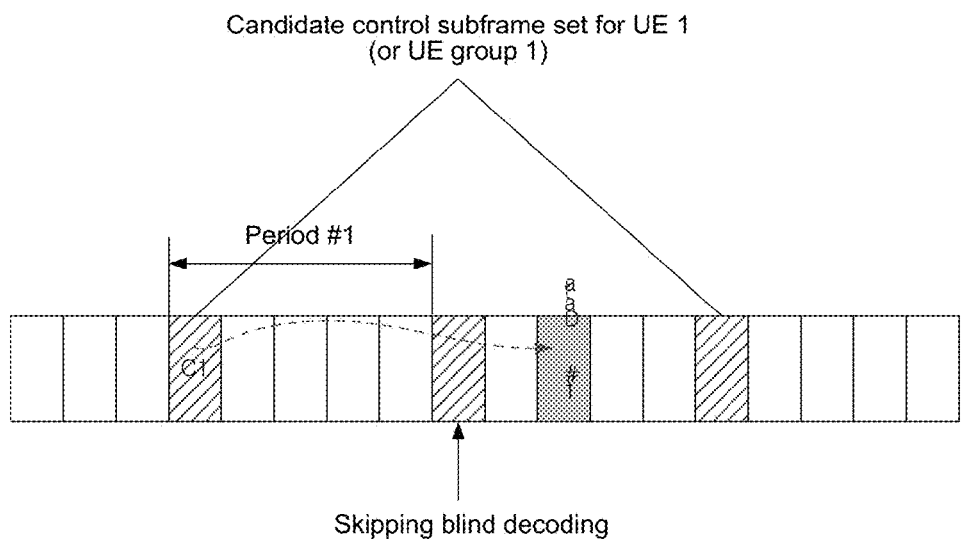
FIG. 8 is a diagram for explaining a method of predetermining a location at which data corresponding to control information is received.

FIG. 8 is a diagram for explaining a method of predetermining a location at which data corresponding to control information is received.

In FIG. 8, if it is known as C1 is decoded and data for the decoded C1 is delivered in a data #1 subframe, monitoring is not performed under an assumption that the C1 does not exist in a subframe periodically reserved to transmit control information appearing after the C1. FIG. 8 shows an example that control information monitoring and decoding are not performed in the subframe reserved for transmitting the C1 existing between the C1 and the data #1. This can be regarded as a DTX operation performed to reduce power consumption since it is able to know in advance that it is not necessary to perform the control information monitoring and the decoding. More specifically, although a control information subframe reserved for transmitting control information exists between the control information and a data transmission subframe indicated by the control information, blind decoding skipping is not performed on all subframes between the control information subframe and the data transmission subframe. Instead, the blind decoding should be excluded from monitoring subframes only when a predetermined condition is precisely satisfied.

Figure 9:
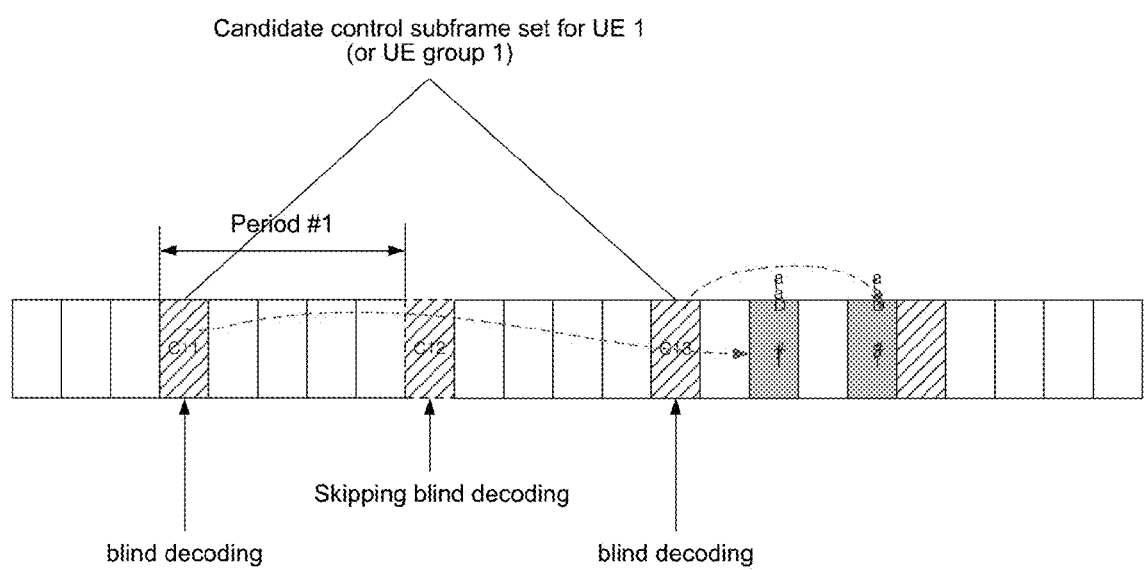
FIG. 9 is a diagram for explaining a method of not decoding a partial subframe only among subframes between control information and data.

FIG. 9 is a diagram for explaining a method of not decoding a partial subframe only among subframes between control information and data.

Referring to FIG. 9, blind decoding is performed on C11 and C13 while blind decoding is skipped on C12. In particular, bind decoding is not skipped for all candidate control monitoring subframes between C11 and data #11. For example, monitoring is performed to perform blind decoding on the last subframe among candidate subframes existing between the C11 and the data #11. Or, if N number of scheduling information candidate subframes exists between a scheduling information subframe and a data transmission, it may be required to have such a rule that blind decoding skipping is not performed on the K number of candidate subframes positioned at the back only. It is able to configure a value of the K according to system management.

If it is able to separately recognize a subframe used for transmission and a subframe used for reception (if subframes of two types distinguished from each other exist since it is unable to perform transmission and reception at the same time due to half-duplex restriction) among subframe information subframes, the blind decoding skipping principle can be applied to the subframe used for transmission only. If there is no distinction, it may apply the rule in consideration of both types.

If there exists the term of validity of scheduling information, a UE may expect that additional scheduling information does not arrive during the term of validity. In particular, it is able to ignore scheduling information arrived during the term of validity.

Since a plurality of UEs use a scheduling information subframe together, a UE can calculate a subframe to be monitored by the UE using a different parameter such as an ID of the UE, a D2D subframe index, or the like. This is similar to a case that a UE calculates a paging subframe to be monitored by the UE using a UE ID and a different parameter, i.e., the UE calculates a subframe index to be received by the UE after being woke up from a sleep mode.

Figure 10:
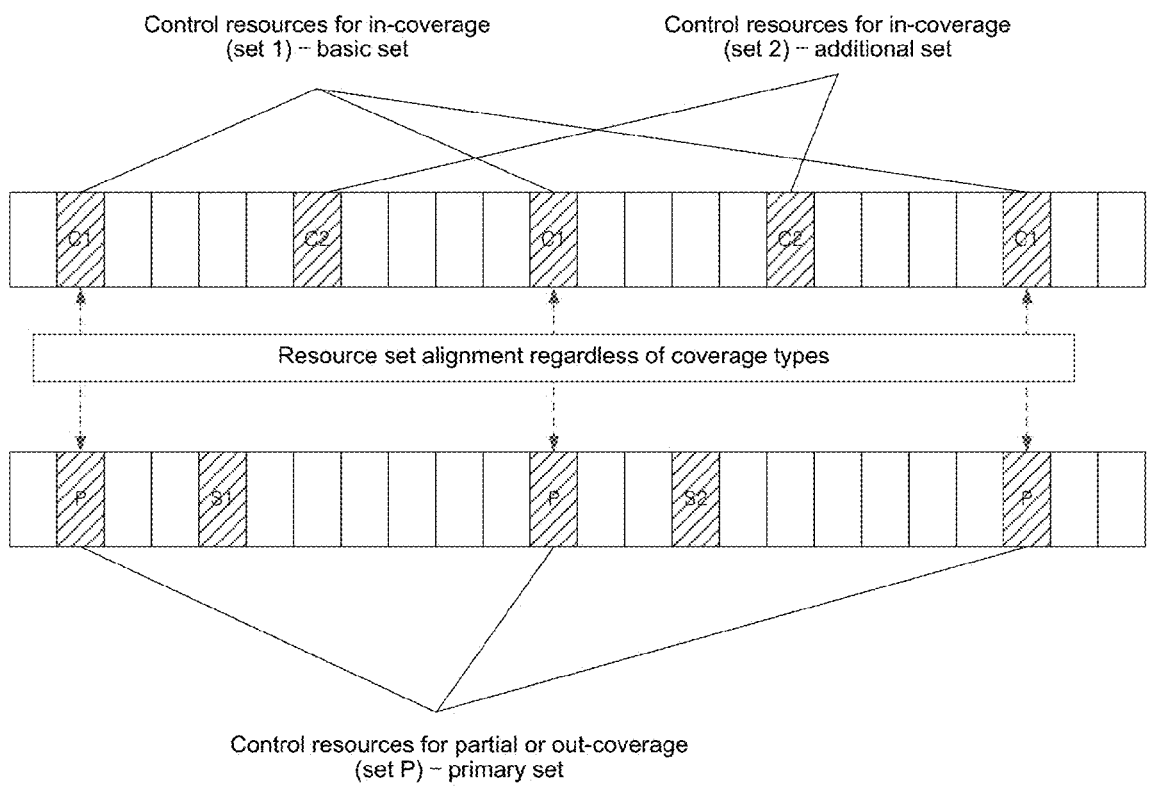
FIG. 10 is a diagram for explaining a method of configuring a partial resource to be a common resource among two allocated resources when two resource allocation methods are used in a manner of being mixed.

FIG. 10 is a diagram for explaining a method of configuring a partial resource to be a common resource among two allocated resources when two resource allocation methods (mode 1 and mode 2) are used in a manner of being mixed.

The two resource allocation methods used in the present example are shown in Table 1 in the following.

TABLE 1

| Signaling methods | Being transmitted Scenarios | Resource (or Resource Pool) indication methods (to be used for the following transmission) | |
|---|---|---|---|
| Resource Allocation | | For Scheduling Assignment | For Data communication |
| Mode 1 (eNB schedules) | In-coverage | SIB (or (E)PDCCH) (This can be triggered by D2D scheduling request (D-SR)) | SIB (or (E)PDCCH) (This can be triggered by D2D scheduling request (D-SR)) |
| | Edge-of-coverage | Via other forwarding UE(s) SIB or other sig. forwarding | Via other forwarding UE(s) SIB or other sig. forwarding |
| | Out-coverage | Pre-configured or other | Pre-configured or other |
| | Semi-static resource pool restricting the available resources for data and/or control may be needed D2D communication capable UE shall support at least Mode 1 for in-coverage | | |
| Mode 2 (UE selects) | In-coverage | SIB (or (E)PDCCH) | SIB (or (E)PDCCH) |
| | Edge-of-coverage | Via other forwarding UE(s) SIB or other sig. forwarding | Via other forwarding UE(s) SIB or other sig. forwarding |
| | Out-coverage | Pre-configured or other | Pre-configured or other |
| | The resource pools for data and control may be the same Semi-static and/or pre-configured resource pool restricting the available resources for data and/or control may be needed D2D communication capable UE shall support Mode 2 for at least edge-of-coverage and/or out-of-coverage | | |

According to the example of FIG. 10, C1 and P resource are configured to be an identical time and/or frequency resource. FIG. 10 shows a case that the time and/or frequency resource is configured as a common resource (e.g., cell specific, UE-group-specific). According to the method, when a resource allocation scheme is switched, it may be able to use a control channel as a fallback subframe to be monitored. In particular, the fallback subframe corresponds to a candidate subframe in which control information is transmitted. The candidate subframe should be monitored when a mode is switched.

It is necessary for UEs to which a resource is allocated by the mode 1 and UEs to which a resource is allocated by the mode 2 to perform blind decoding on both a P resource region and a C1 resource region. In this case, UEs belonging to a cell may have a different mode. Moreover, a UE can be configured by two modes.

In this case, the mode 1 and the mode 2 consider not only a communication resource allocation scheme but also a case of being applied to D2D discovery resource allocation. Moreover, in the aspect of a UE, it may be able to configure a discovery resource by the mode 1, it may be able to configure communication by the mode 2, and vice versa. Of course, it may be able to have a communication combination that the mode 1, the mode 2, and discovery exist in a manner of being mixed in the aspect of a plurality of UEs. In this case, it may be able to introduce a concept of a default resource set or a common resource set to the mode 1 or the mode 2 to make a predetermined UE or UE group, an entire cell, or a D2D enabled UE monitor the common resource set.

Based on the aforementioned contents, a method of configuring a DCI format of a D2D grant is explained in the following.

<Format of D2D Grant>

Figure 11:
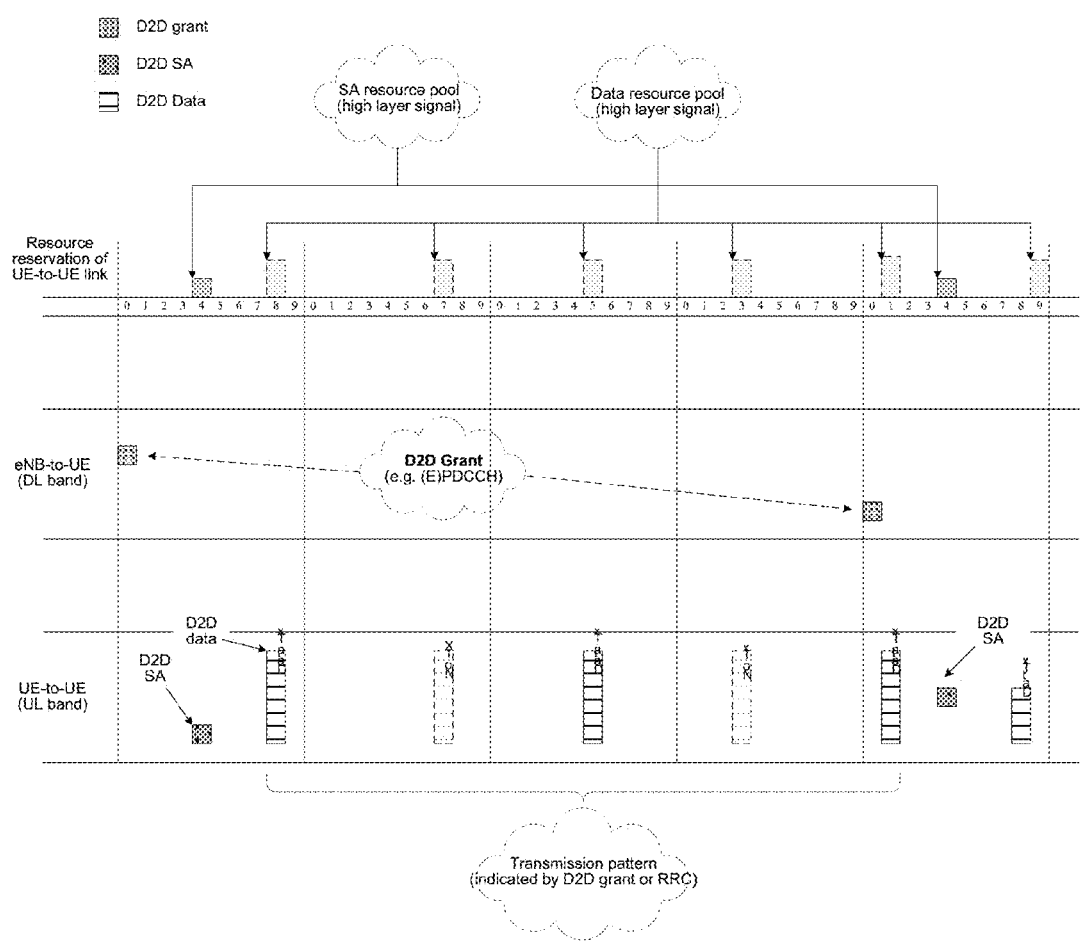
FIG. 11 is a diagram for various signals used for a D2D operation.

FIG. 11 is a diagram for various signals used for a D2D operation.

An eNB can inform D2D UEs of an SA resource pool and a data resource pool via a higher layer signal. And, the eNB can inform the D2D UEs of activation of the resource via a D2D grant. The D2D grant can be transmitted via (E)PDCCH or the like.

Hence, as shown in FIG. 11, a Tx UE can transmit D2D SA and data to an Rx UE using a given resource.

In FIG. 11, a D2D grant plays a role in allocating a resource required for transmitting SA and data and delivering control information such as MCS and the like (i.e., scheduling information) in a D2D Tx UE. However, since it is necessary to schedule both SA transmission and data transmission, the amount of control information is too much to configure a single DCI format. Yet, if two DCI formats are configured, signaling burden becomes huge. Hence, as a compromise plan, a method of scheduling both the SA and the data with a single DCI format by appropriately configuring a field is proposed in the following.

FIG. 12 is a diagram for a DCI format 0 in a LTE system.

A DCI format 0 corresponds to a representative DCI format of uplink scheduling and includes control information such as FH, RA, MCS, and the like.

As mentioned in the foregoing description, it is able to carry SA and data scheduling information only when two DCI formats shown in FIG. 12 are used. A basic principle for integrating the two DCI formats into one is to examine characteristics of D2D transmission, replace fields correlated with each other in the course of controlling SA transmission and data transmission with an integrated field, and configures a part not including correlation as a separate field.

First of all, since the FH is commonly applied, one field is left only. The MCS field exists when an eNB notifies the MCS field. If a UE autonomously determines the MCS field, the field is not necessary to exist. The NDI and the RV can be similarly configured. In case of the TPC, it is preferable to differently apply the TPC to the SA and the data. Hence, it may transmit two TPCs or it may be able to configure a TPC and an offset TPC according to the TPC. Due to the characteristic of D2D, information such as an Rx ID and the like can be additionally configured.

Figure 13:
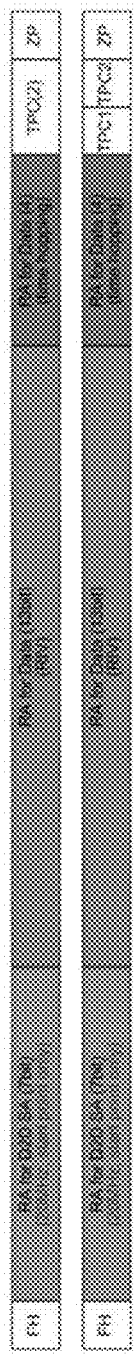
FIG. 13 is a diagram for a DCI format for D2D according to one embodiment of the present invention.

FIG. 13 is a diagram for a DCI format for D2D according to one embodiment of the present invention.

Specifically, FIG. 13 shows a method of delivering an SA RA and a data RA in a manner of separating the SA RA from the data RA. Bits shown in FIG. 13 are just an example. A size of bits can be differently defined according to necessity. In case of the SA RA, it may be able to notify a start point only. In case of the data RA, similar to a UL RA scheme, it may be able to notify a start point of data and a length by delivering a single RIV value. Although it is able to notify the start point and an end point using a separate field, an additional 1 bit is required for the separate field. In particular, a data RA time hopping field is newly added. A value of the data RA time hopping field is used for indicating a data subframe time pattern to be used for transmitting D2D data in time domain. In FIG. 13, a form delivering separate power control information to the SA and the data is shown in the drawing. ZP corresponds to zero padding. The ZP is filled with control information according to necessity. The ZP may not be used or does not exist.

Figure 14:
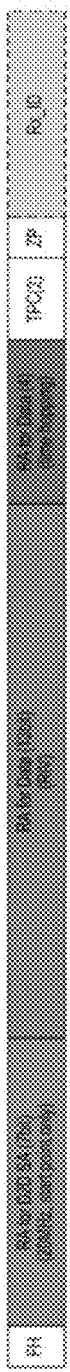
FIG. 14 is a diagram for an example of adding an Rx ID field according to one embodiment of the present invention.

FIG. 14 is a diagram for an example of adding an Rx ID field according to one embodiment of the present invention.

A unique point of FIG. 14 is a DCI format field configuration which is configured in consideration of a point that an Rx ID is capable of being delivered (except an RA field distinction). This is because, similar to unicast, the Rx ID is usable for the usage of designating a target UE or a group ID. An order of fields of a DCI format shown in the drawing may change.

Figure 15:
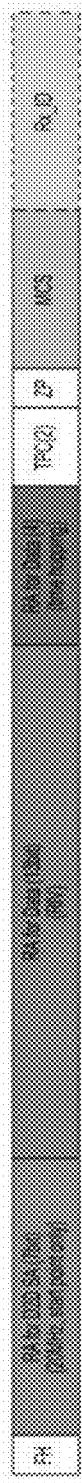
FIG. 15 is a diagram for an example of adding an MCS field according to one embodiment of the present invention.

FIG. 15 is a diagram for an example of adding an MCS field according to one embodiment of the present invention.

Specifically, referring to FIG. 15, MCS is added to RA field separation, time hopping, and an Rx ID. MCS information determined by an eNB is added to a DCI format under an assumption that the eNB is more aware of a D2D link compared to a D2D Tx UE (via a buffer status report, and the like). Similar to a different drawing, ZP can be omitted. A TPC field can be divided into two TPC fields or one field can be configured to have information of the two TPC fields.

Figure 16:
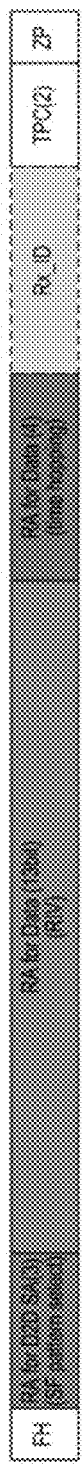
FIG. 16 is a diagram for a case capable of adjusting a length of an SA field according to one embodiment of the present invention.

FIG. 16 is a diagram for a case capable of adjusting a length of an SA field according to one embodiment of the present invention.

Specifically, referring to FIG. 16, a length of an SA field is adjusted to be smaller instead of including an Rx_ID. This is feasible because an SA resource region is not directly designated in the SA field and an indicator indicating one of predetermined subframe pattern sets is included in a DCI format. In this case, a size of bits of the indicator is reduced to 3 bits.

FIGS. 17 to 20 are diagrams for other embodiments of the present invention.

Figure 17:
FIGS. 17 to 20 are diagrams for other embodiments of the present invention.
Figure 18:

Specifically, FIG. 17 shows field configuration information when the Rx_ID mentioned earlier in FIG. 16 is added and FIG. 18 shows a case of adding DM RS CS information to a DCI format.

Figure 19:
Figure 20:

And, FIG. 19 shows a case that the Rx ID is removed and the DM RS CS is maintained and FIG. 20 shows a case that the Rx ID is added to the embodiment of FIG. 19.

It may be able to make correlation exist between the RA fields of the two types. Assume that there exist an RA1 for SA and an RA2 for data. In this case, the RA1 may indicate a location of an SA resource region and information obtained from a combination of the RA1 and the RA2 may indicate a location of a data resource region. In particular, it may consider there exist correlation between the SA resource region and the data resource region. An RA field configuration configures an indication bit in a manner of including correlation between RA field information by utilizing the correlation between the SA resource region and the data resource region. On the contrary, information on the data resource region can be obtained based on information of the RA2 and information on the SA resource region can be obtained based on a combination of the RA2 and the RA1. As a more concrete example, one RA2 indicates a practically transmitted resource region (time and frequency position) and another RA1 indicates a position apart from the time and the frequency position of the RA2, i.e., offset position information only, and vice versa. In particular, the RA1 indicates precise resource region information and the RA2 indicates offset information in response to the precise resource region information. The resource region information and the offset information are used for the SA resource region and the data resource region, respectively.

<Single RA and Single RPT in D2D Grant>

An eNB transmits a D2D grant to a D2D TX UE to enable the D2D TX UE to transmit D2D to a D2D RX UE by utilizing a value indicated by Table 2 in the following. Table 2 in the following is just an example. A field name, a length and a usage may vary.

TABLE 2

| Field Name | Length | Use in D2D-Data-grant |
|---|---|---|
| Flag for format0/format1A differentiation | 1 | RPT index |
| Hopping flag | 1 | Use as is |
| N_Ulhop | 1 (1.4 MHz) | Use as is |
|  | 1 (3 MHz) |  |
|  | 1 (5 MHz) |  |
|  | 2 (10 MHz) |  |
|  | 2 (15 MHz) |  |
|  | 2 (20 MHz) |  |
| Resource block assignment | 5 (1.4 MHz) | Use as is for resource of data. |
|  | 7 (3 MHz) | Resource of SA is derived |
|  | 7 (5 MHz) | from this field. |
|  | 11 (10 MHz) |  |
|  | 12 (15 MHz) |  |
|  | 13 (20 MHz) |  |
| MCS and RV | 5 | Use as is for data |
| NDI (New Data Indicator) | 1 | RPT index |
| CQI request (1 bit) | 1 | RPT index |
| TPC for PUSCH | 2 | Use as is |
| Cyclic shift for DM RS | 3 | Use as is (or 1~2 bit can be used for other purpose like RPT or target ID) |
| UL index (TDD only) | 2 | Reserved |
| Downlink Assignment Index (DAI) | 2 | Reserved |

Or, it may be able to modify a structure shown in Table 2. For example, all DM RS related information can be deleted and all bits can be used for designating RPT. By doing so, it may be able to have a structure shown in Table 3 in the following. In this case, it may be able to use 6 bits in total for the RPT.

TABLE 3

| Field Name | Length | Use in D2D-Data-grant |
|---|---|---|
| Hopping flag | 1 | Use as is |
| N_Ulhop | 1 (1.4 MHz) | Use as is |
|  | 1 (3 MHz) |  |
|  | 1 (5 MHz) |  |
|  | 2 (10 MHz) |  |
|  | 2 (15 MHz) |  |
|  | 2 (20 MHz) |  |
| Resource block assignment | 5 (1.4 MHz) | Use as is for resource of data. |
|  | 7 (3 MHz) | Resource of SA is derived |
|  | 7 (5 MHz) | from this field. |
|  | 11 (10 MHz) |  |
|  | 12 (15 MHz) |  |
|  | 13 (20 MHz) |  |

TABLE 3-continued

| Field Name | Length | Use in D2D-Data-grant |
|---|---|---|
| MCS and RV | 5 | Use as is for data |
| TPC for PUSCH | 2 | Use as is |
| RPT indication | 6 | New field |
| UL index (TDD only) | 2 | Reserved |
| Downlink Assignment Index (DAI) | 2 | Reserved |

In this case, bits belonging to an RPT indication field can be divided into two parts again (the two parts can be divided into top several bits and the remaining bits in the RPT field. Or, the two parts can be divided by a status represented by a single field).

Figure 21:
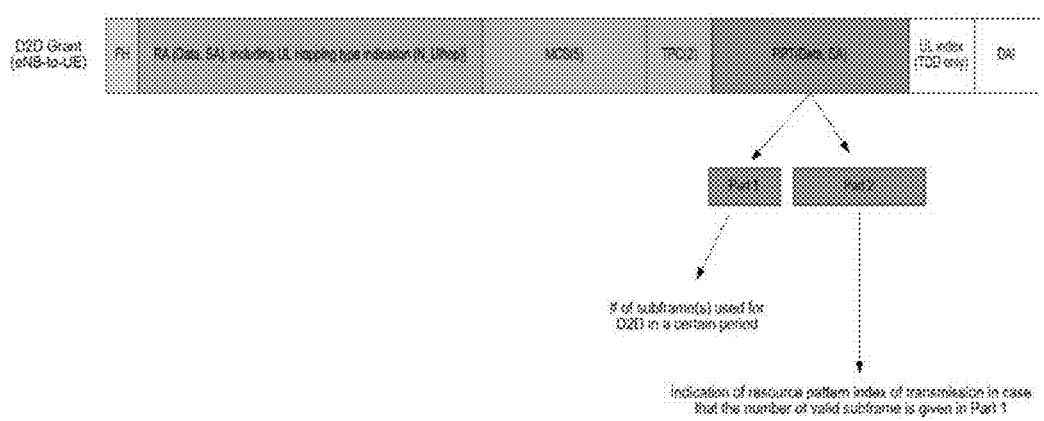
FIG. 21 is a diagram for explaining a case of configuring bits belonging to an RPT indication field by dividing the bits into two parts according to one embodiment of the present invention.

FIG. 21 is a diagram for explaining a case of configuring bits belonging to an RPT indication field by dividing the bits into two parts according to one embodiment of the present invention.

A first part indicates how many subframes are granted for D2D transmission among the total subframes capable of performing D2D.

As an example, 2 bits can be used for the usage of indicating the subframes in which D2D transmission is granted. An eNB can indicate a location of a subframe capable of performing D2D to which one time SA is applied via system information or a higher layer signal such as RRC. Hence, a UE is able to identify the number of subframes capable of performing D2D and becoming a target of the SA via the indication of the eNB. As a simple method, the number may become the number of subframes configured as a D2D data subframe between two adjacent SA periods. In this case, assume that total A number of subframes are configured as the subframe capable of transmitting D2D data. If a UE receives a D2D grant, the UE is able to identify that the B number of subframes are granted for transmission of the UE via the bits among the A number of subframes capable of transmitting D2D data. Methods of identifying the number of subframes in which D2D transmission is practically granted using the field is explained in detail in the following.

The number of practical D2D subframes, which is designated according to each state of a corresponding part, can be determined in advance. For example, state '00', '01', '10', and '11' can be connected with 1, 2, 3, and 4 subframes, respectively.

The number of practical D2D subframes, which is designated according to each state of a corresponding part, can be predetermined by a ratio to the total number of subframes capable of performing D2D. For example, state '00', '01', '10', and '11' can be connected with floor (A/X) subframes, floor (2A/X) subframes, floor (3A/X) subframes, and floor (4A/X) subframes, respectively. In this case, the X corresponds to a predetermined number. It may be able to comprehend the number of subframes corresponding to 1/X, 2/X, 3/X, or 4/X as an operation of allocating practical transmission via each state among the total A number of subframes capable of performing D2D.

The number of practical D2D subframes, which is designated according to each state of a corresponding part, can be predetermined by such a higher layer signal as RRC and system information.

Based on this, a UE is able to know that D2D transmission is granted in the B number of subframes among the total A number of subframes.

Figure 22:
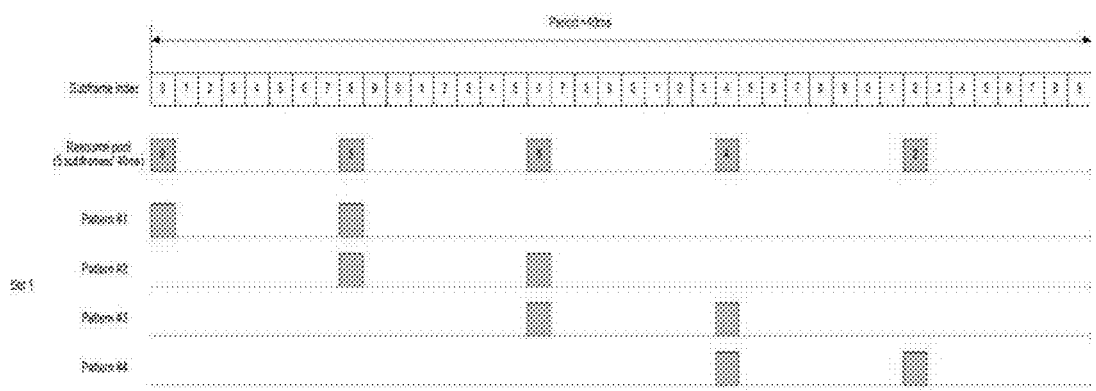
FIG. 22 is a diagram for explaining an example that D2D transmission is permitted to a partial subframe only among the entire subframes.

FIG. 22 is a diagram for explaining an example that D2D transmission is permitted to a partial subframe only among the total subframes.

In this case, it may be able to generate a plurality of candidate subframe patterns based on a predetermined rule. Each of a plurality of the candidate subframe patterns determines a method of transmitting D2D in the B number of subframes among the A number of subframes. Then, an eNB can determine a pattern to be practically used among the candidate patterns using a second part of the bits belonging to the RPT indication field.

As an example, 4 bits can be used as the second part. In this case, one pattern can be designated from among maximum 16 candidate patterns. The eNB can dynamically control the number of subframes used for transmitting D2D data by each UE in each SA period via the aforementioned methods. In particular, the number of subframes can be controlled according to D2D data traffic amount of the UE.

Meanwhile, signaling on the B number of subframes in which transmission of the UE is granted can be applied to D2D data transmission only. In case of SA transmission, since it is not necessary to control the number of transmission subframes according to a traffic situation, the number of subframes used for transmitting SA can be fixed via a higher layer signal such as RRC or the like. Or, in order to perform control in a form identical to D2D data, a bit field for designating the number of subframes in which transmission of a UE is granted is reused and the number of subframes in which SA transmission is granted can also be dynamically controlled.

Figure 23:
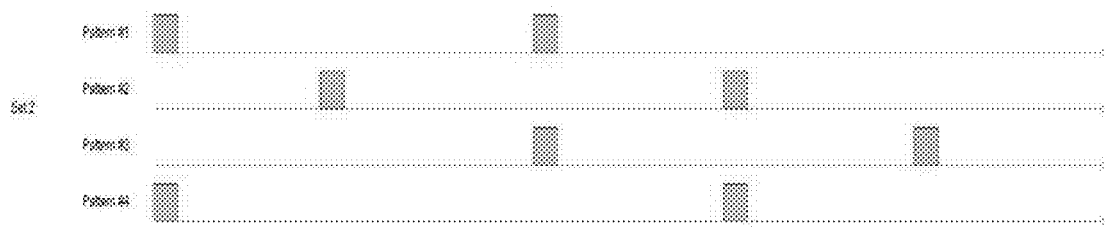
FIG. 23 is a diagram for explaining a case of utilizing a plurality of sets while a partial subframe is used for D2D transmission among the entire subframes according to one embodiment of the present invention.

FIG. 23 is a diagram for explaining a case of utilizing a plurality of sets while a partial subframe is used for D2D transmission among the total subframes according to one embodiment of the present invention.

In particular, although A (a subframe in which D2D data is transmitted) and B (a practically transmitted subframe) are determined, as shown in FIG. 23, there may exist a plurality of sets corresponding to the A and the B. In particular, a plurality of sets such as 1, 2, 3, . . . , N may exist. Assume that a set to be used is indicated by an eNB via a signal. In particular, the eNB indicates information on a set to be used in advance via an RRC signal. An example of a different type of a set (set B) is described in the following.

Among the aforementioned control information fields, the RA field needs to have many bits to represent an SA position and a data position. In fact, the SA position and the data position are important for performing D2D transmission and reception. Yet, the number of bits required for transmitting the D2D is not less, reducing the number of bits considerably influences control channel performance. As a method of integrating RAs of two types into a single RA form, different RA information can be induced from single RA information.

For example, if RB x, x+1, . . . , x+a−1 are assigned to D2D data, an RB used as an SA (assume that the number of RBs of the SA corresponds to b) can be represented as follows.

First of all, if a data RA is allocated, a start point of an SA is identical to a start point of the data RA and the SA occupies the b number of RBs. Of course, in this case, practical transmission of the SA can be transmitted in a subframe identical to a subframe in which data is transmitted or a different subframe. Hence, an SA RB index can be represented as x, x+1, . . . , x+b−1. Similarly, if the b number of RBs are occupied from the last point of the data RA, the SA is transmitted to b RB band in a manner of starting at (x+a−1)−b point. In particular, the SA RB index can be represented as x+a−b−1, x+a−b, . . . , x+a−1.

Meanwhile, it may be able to locate at the center of the data RA. In this case, the SA RB index can be represented as $$x + \left\lceil \frac{a-b}{2} \right\rceil, x + \left\lceil \frac{a-b}{2} \right\rceil + 1, \ldots, x + \left\lceil \frac{a-b}{2} \right\rceil + b - 1.$$

In this case, SA RB center may not correspond to data RB center. In some cases, the SA RB center may be apart from the center as many as 1 or 2 RBs. If the number of the data BR has an even number and the number of the SA has an odd number, the SA is unable to locate at the center of the data RB. Hence, an index position greater than the center as many as one or an index position less than the center as many as one may become the SA center. If the number of the data RB has an odd number and the number of the SA has an odd number, two resource regions may have an identical center. However, if the number of the data RB has an odd number and the number of the SA has an even number, the centers may have a difference as many as 1 RB. In summary, if the number of the data RB and the number of the SA RB identically have an even number of an odd number, centers of the two allocated resource regions are identical to each other and the resource regions can be located at the center. However, if one of the number of the data RB and the number of the SA RB corresponds to an even number and another one corresponds to an odd number, the resource regions are unable to be located at the center. Hence, a special rule is required for the above mentioned case. In particular, it is necessary to determine the center among an index (X_c−1) smaller than the center (center x_c) and an index (x_c+1) greater than the center. The center can be determined by a fixed value according to a predetermined rule. Yet, since the center may vary according to a bandwidth size, an allocated resource size or ratio (data, SA), a transmission mode, an operation mode, or the like, the center can be configured by a higher layer signal. And, it is able to perform blind decoding on a location of the SA on the basis of the center and information obtained from the location information can be used for the usage of determining a transmission/operation mode.

Meanwhile, SA allocation is not available for all RB indexes. For example, there is a restriction that SA should be located at an index corresponding to a multiple of C. If a restriction is placed on a start point of the SA (if a start point of an RB index corresponds to a multiple of C), the start point can be defined as $$C \left\lceil \frac{a - x + \left\lceil \frac{a-b}{2} \right\rceil}{c} \right\rceil.$$

In the aforementioned transmission scheme, if the SA and the data are designated by an identical subframe, the SA can be punctured or rate matched with the data.

In LTE RA, it may be able to indicate an RIV (resource indication value) introduced to a TYPE 2 contiguous RA. In this case, the RIV indicates a start RB (RB_start) and a length of RB (RB_length) via a predetermined equation (conversion table). Hence, the parameter can be applied to the equation as it is.

And, since a location of the SA is included in a data transmission band, indication can also be performed by utilizing a subset of RIV. For example, as shown in Table 4 in the following, if RIV_data=16 is signaled in response to 5RB BW, a start position (RB_start) of the data corresponds to 1 and a length (RB_length) corresponds to 4.

TABLE 4

| | RIV = 16 | | | | |
|---|---|---|---|---|---|
| | Start | | | | |
| length | 0 | 1 | 2 | 3 | 4 |
| 1 | 0 | 1 | 2 | 3 | 4 |
| 2 | 5 | 6 | 7 | 8 | 9 |
| 3 | 10 | 11 | 12 | 13 | 14 |
| 4 | 15 | 16 | 17 | 18 | 19 |
| 5 | 20 | 21 | 22 | 23 | 24 |
| | 0 | 1 | 2 | 3 | 4 (date) |

Since the data transmission band corresponds to 4 RBs and the SA is transmitted in the band, as a method of indicating the SA, 4RB-based RIV_SA table is configured as follows and it may be able to perform RIV_SA signaling in accordance with the table. In particular, if a data transmission band is determined, an RIV table is generated in accordance with the bandwidth and an RIV for the SA is determined and transmitted. A reception procedure is performed inversely. A start point and a length of data are found out by receiving an SA RIV and a start point and a length of an SA are found out by receiving an SA RIV. Table 5 in the following shows an example of the RIV table for the SA.

TABLE 5

| | RIV = 4 | | | | |
|---|---|---|---|---|---|
| | Start | | | | |
| length | 0 | 1 | 2 | | |
| 1 | 0 | 1 | 2 | | |
| 2 | 3 | 4 | 5 | | |
| 3 | 6 | 7 | 8 | | |
| | 0 | 1 | 2 | 3 | 4 (date) |

In the example, a table for interpreting RIV=4 corresponding to SA resource region information is a value obtained from a table for interpreting RIV=16 corresponding to data resource region information.

Additionally, since RIV_SA table is determined based on an RIV_SA value, although the RIV_SA value varies, it is able to know a length of the value. Hence, it is not difficult to perform decoding. If a partial bit is not used due to a variable length, a predetermined specific bit can be used to enhance a coding gain.

Meanwhile, not only an RA but also an RPT (resource pattern of transmission), which indicates a time-domain resource allocation pattern of an SA subframe and a data subframe, can obtain an SA and a data RPT from a single RPT. It is preferable to configure an RPT (data, SA) field to indicate data and SA RPT at the same time like a DCI format shown in the drawing.

Assume that an SA subframe pattern set exists and pluralities of RPTs exist in the set. Similarly, assume that a data subframe pattern set exists and pluralities of RPTs exist in the set.

SA RPT set={SA_pattern-1, SA_pattern-2, . . . , SA_pattern-N}

Data RPT set={Data_pattern-1, Data_pattern-2, . . . , Data_pattern-M}

For example, if a D2D grant DCI format RPT field receives such a value as RPT=0010, the field recognizes the value as 2, selects SA_pattern-2 for SA RPT, and selects Data_pattern-2 for data RPT. In this case, the SA_pattern-2 and the Data_pattern-2 do not mean an identical pattern. In particular, each pattern corresponds to a pattern selected from an independent pattern set which is defined in accordance with its own purpose. In particular, although an identical value is indicated, an RPT pattern applied to the SA and an RPT pattern applied to the data are different from each other.

In addition, when the number of the SA RPT patterns and the number of the data RPT patterns are compared with each other, it is highly probable that the number of the SA RPT patterns is less than the number of the data RPT patterns. If the number of the SA RPT patterns is less than the number of the data RPT patterns, it may be able to use an SA RPT value by performing modulo calculation on an RPT value of a DCI format using a maximum number (N) of the SA RPT pattern. For example, when the number of the SA RPT patterns corresponds to 4 and the number of the data RPT patterns corresponds to 8, if RPT index=6 is signaled as a D2D grant, an Rx UE uses a value resulted from performing modulo calculation on 6 by the total number of SA patterns (i.e., mod(6,4)=2) as an RPT pattern index. On the contrary, data uses 6 as a data RPT pattern index as it is. In particular, since a field of a DCI format and a signaling format are determined according to the number of data RPT pattern indexes, if the value exceeds the SA RPT pattern index, the SA RPT pattern index can be determined using the modulo calculation.

<Mapping Relationship between SA RB and Data RB>

In order to induce resource allocation information (location) of data from resource allocation information of SA or, in order to induce resource allocation information of SA from resource allocation information of data, there should be a consistent relationship between the resource allocation informations. For example, assume that data #0 RB index is induced from SA #0 RB index and data # k RB index is induced from SA # k RB index. In this case, if an SA transmission unit is fixed by N_sa=2BRs and a data transmission unit is fixed by N_data=4RBs, it may be able to represented as SA RB index*2=Data RB index.

Figure 24:
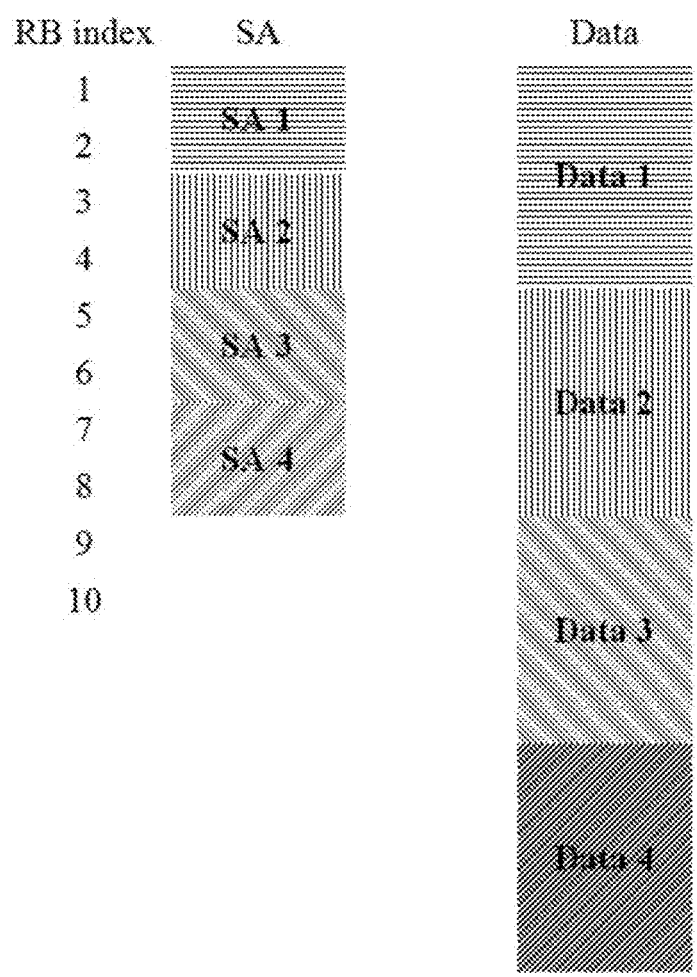
FIG. 24 is a diagram for a location relationship between an SA RB and a data RB according to one embodiment of the present invention.

FIG. 24 is a diagram for a location relationship between an SA RB and a data RB according to one embodiment of the present invention.

As a simple solution, it is able to fix a BW. Yet, in order to efficiently use a resource, it may be able to configure the number of RBs to be changed. For example, it may be able to configure the number of RBs to be semi-statically changed by informing a D2D UE of an SA RB size and a data RB size via SIB or an RRC signal (or PD2DSCH). The above-mentioned method can include two methods. A first method corresponds to a method that an SA transmission unit (RB number, e.g., 2RBs or 4RBs) is fixed and a data transmission unit (RB number) varies from 1 RB to 100 RBs. A second method corresponds to a method that both the SA transmission unit and the data transmission unit vary. First of all, the first method is explained. If the SA is configured by 2 RBs and the data is configured to vary with 2, 4, 6, 8 RBs, it is able to induce a data RB index from an SA RB index using a combination of an SA transmission unit and a data transmission unit.

TABLE 6

| If SA = 2, Data = 2 are signaled/configured => Data RB index = 1*SA RB index |
| If SA = 2, Data = 4 are signaled/configured => Data RB index = 2*SA RB index |
| If SA = 2, Data = 6 are signaled/configured => Data RB index = 3*SA RB index |
| If SA = 2, Data = 8 are signaled/configured => Data RB index = 4*SA RB index |
| If SA = 3, Data = 3 are signaled/configured => Data RB index = 1*SA RB index |
| If SA = 3, Data = 6 are signaled/configured => Data RB index = 2*SA RB index |

If a data transmission unit is divided by an SA transmission unit and a share corresponds to N_map, it is able to induce a data RB index by multiplying an SA RB index by the N_map. For a simple implementation, it may be able to restrict transmission unit/allocation units of the SA and the data to have a relationship of integer multiple. If the SA unit corresponds to 2 RBs, the data unit uses a transmission unit of a multiple of 2 (e.g., 2, 4, 6, or 8) or a transmission unit of the power of 2 ($2^x$) (e.g., 2, 4, 8, 16 . . . ) only (signaling or configure or equation or calculation). For example, it is able to configure the N_map to be an integer all the time. This rule can also be used for the usage of checking an error in a signaling or configuring procedure.

If an SA is detected, an SA RB index is found out, and the SA RB index is multiplied by an N_map value, a data RB index is induced. In this case, for clarity, a start RB index is explained as an example. Yet, various values including a center RB index, an end RB index, and the like can be used as a reference RB index as well.

If a resource gap (e.g., reserved RB, guard RB, . . . ) is introduced in the course of allocating an SA or a data due to additionally considered items such as in-band emission and the like, it is necessary to induce an SA RB index or a data RB index in consideration of an RB used for the resource gap.

Figure 25:
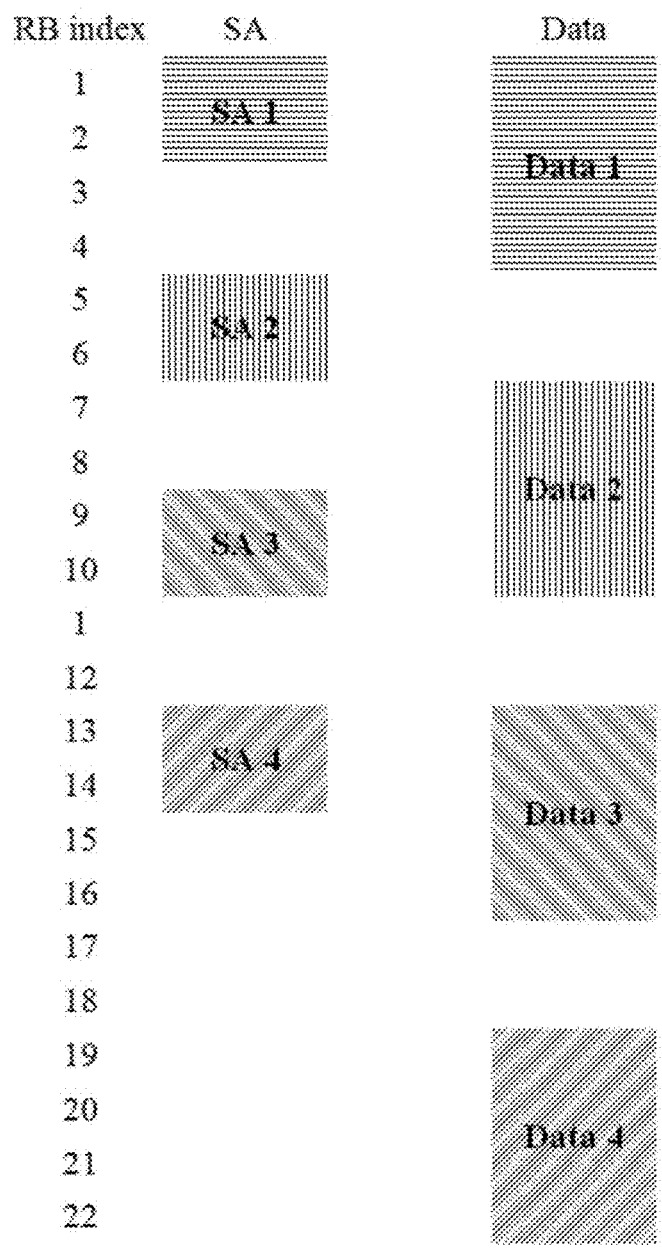
FIG. 25 is a diagram for a case of configuring a resource gap between an SA RB and a data RB according to one embodiment of the present invention.

FIG. 25 is a diagram for a case of configuring a resource gap between an SA RB and a data RB according to one embodiment of the present invention.

In case of using a resource gap, it is necessary to signal the resource gap via a high layer signal. For example, as shown in FIG. 25, in case of using a reserved gap of 1 RB, it is necessary to calculate a data RB index under an assumption that the reserve gap is configured between the data transmission units and/or the SA transmission units.

If SA=2, Data=4 are signaled/configured=>Data RB index (i)=2*SA RB index (i)+i*reserved RB gap (e.g. 1 RB), i=1, 2, 3, . . . .

It may be able to configure various rules to induce a data RB index from an SA RB index according to an SA RB allocation method (including a reserved gap).

FIG. 26 is a diagram for a case of not configuring a resource gap between data RBs while a resource gap is configured between SA RBs according to one embodiment of the present invention.

Referring to an example of FIG. 26, SA RBs are repeated in a unit of 2 RBs for a simple configuration and a location of an RB can be directly obtained via an SA RB index using a gap of 2 RBs, by which the present invention may be non-limited.

As a different method, it may consider a case that SA and data of different transmission units coexist in an identical subframe. It may be able to configure a data RB index to be induced from an SA RB index in a manner of configuring a plurality of transmission units and dividing an allocation region. It may be able to configure a location of SA allocated in a transmission unit of 2 RBs to be different from a location of SA allocated in a transmission unit of 3 RBs, configure a boundary between the locations, and reflect the boundary to calculation.

<Method of Allocating SA Resource Using LTE PUSCH Hopping Scheme>

Resource allocation for SA of a D2D grant and/or a data field can be classified into two types. This field is divided into an RA part 1 and a part 2 and each part can carry information described in the following.

TABLE 7

| | RA Part 1 | RA Part 2 |
|---|---|---|
| Alt.1 | Time-frequency resource allocation information of the first transmission of SA (then, that of the other transmission (e.g. repetition, retransmission) can be derived from RA1) | Time-frequency resource allocation information of the first transmission of Data (then, that of the other transmission (e.g. repetition, retransmission) can be derived from RA2) |
| Alt.2 | Time-frequency RA information of the first transmission of SA and Data | Information for the other transmission (e.g. repetition, retransmission), except for the first transmission |
| Alt.3 | Resource allocation information of the all types of transmission of SA and Data | The transmission unit size/granularity of SA and Data |

If a potential SA transmission resource is defined as a TxOP (transmission opportunity), the TxOP can be determined by a predetermined period or a period pattern. For example, the TxOP can be determined by 4 subframes located at a subframe index of a multiple of 4 from a specific subframe. In this case, subframes 0, 4, 8, 12 . . . can be determined as an SA TxOP subframe (assume a case that one SA cycle is configured by 4 TxOP subframes).

On the contrary, an SA TxOP subframe can also be determined by an aperiodical pattern. It may or may not transmit SA in the TxOP subframe. This kind of signaling indicates that signaling is not performed due to a signaling overhead problem. In particular, it is necessary for an Rx UE to perform blind searching on all known TxOP subframes to decode SA. In particular, the Rx UE performs blind decoding in a situation that the Rx UE is not precisely aware of a TxOP at which SA is transmitted.

In this situation, it is necessary to determine a location of frequency domain. In case of a mode 1, an eNB indicates the location of frequency domain. In case of a mode 2, a UE autonomously selects the location according to a predetermined rule and transmits the location.

In case of the mode 1, since it is necessary to notify an SA resource, SA RA information should be included in a D2D grant DCI format. Yet, since it is transmitted many times in an SA cycle, it is necessary to notify not only the location (RB index) of frequency domain but also a location (subframe index) of time domain. In case of notifying the time domain and the frequency domain, a method of inducing other transmission location based on first transmission of a cycle is required.

As a method of supporting the inducing method, one preferred embodiment of the present invention proposes to utilize LTE PUSCH hopping formula (type 1 or type 2). A legacy PUSCH hopping formula is defined for every subframe, whereas the rule is applied to a TxOP subframe configured by an eNB only. For example, if 0, 4, 8 and 12 correspond to TxOP subframes only, a legacy PUSCH hopping rule applied to 0, 1, 2, and 3 is applied to 0, 4, 8, and 12.

According to the proposed rule, if a PUSCH hopping formula is shared, it may be able to apply PUSCH hopping using a subframe index, a subframe index defined for D2D, or a specific ID (TX and/or RX) parameter. The proposed scheme also has a merit in that each SA hopping pattern (time-frequency) has an orthogonal characteristic. Of course, an eNB can intentionally configure SA hopping patterns to be overlapped with each other.

In the following, as mentioned in the foregoing description, a method of borrowing LTE PUSCH hopping scheme is explained in detail.

Figures 27, 28:
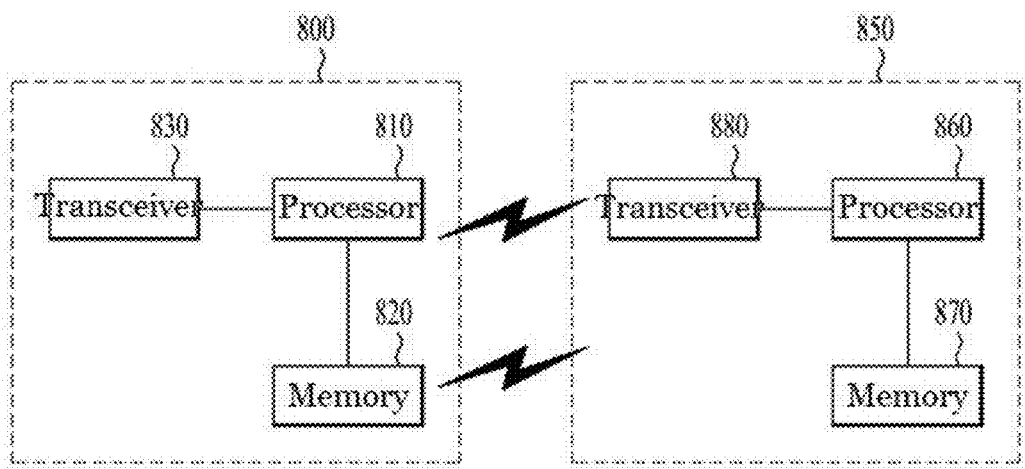
FIG. 27 is a diagram for PUSCH-ConfigCommon IE(Information Element)
FIG. 28 is a diagram for explaining a device configured to perform the aforementioned operation.

FIG. 27 is a diagram for PUSCH-ConfigCommon IE(Information Element).

PUSCH frequency hopping-related cell-specific RRC parameters are descried in the following.

1) n-SB:

$N_{sb}$ Number of subbans

2) Hopping mode: indicates inter-subframe hopping vs. intra&inter-subframe hopping 3) PUSCH-HoppingOffset:

$N_{RB}^{HO}$, indicates whether a PUSCH frequency hopping type corresponds to 1 or 2

When a UE makes a handover, the PUSCH frequency hopping-related cell-specific RRC parameters are restrictively obtained by receiving SIB2 (system information block 2) broadcasted to UEs belonging to a cell in a cell/eNB/RU/RRH except a case that system information of a target cell is optionally included in 'RRCConnectReconfiguration' signaling. Based on the PUSCH frequency hopping-related cell-specific RRC parameters, if PUSCH frequency hopping is applied via a UL scheduling grant, all UEs belonging to the cell can apply inter-subframe hopping or intra&inter-subframe hopping according to an identical hopping rule which is defined based on an identical frequency hopping parameter A PUSCH resource mapping rule of a UE and a PUSCH hopping procedure, which are related to a hopping parameter transmitted via the RRC parameter and the UL scheduling grant, are explained in the following.

Equation 1 in the following corresponds to an equation for calculating parameters necessary for frequency hopping.

$$\tilde{n}_{PRB}(n_s) = \qquad \text{[Equation 1]}$$

$$(\tilde{n}_{VRB} + f_{hop}(i) \cdot N_{RB}^{sb} + ((N_{RB}^{sb} - 1) - 2(\tilde{n}_{VRB} \bmod N_{RB}^{sb})) \cdot f_m(i))$$

$$\bmod(N_{RB}^{sb} \cdot N_{sb})$$

$$i = \begin{cases} \lfloor n_s/2 \rfloor & \text{Inter-subframe hopping} \\ n_s & \text{Intra \& inter subframe frequency hopping} \end{cases}$$

$$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases}$$

$$\tilde{n}_{VRB} = \begin{cases} n_{VRB} & N_{sb} = 1 \\ n_{VRB} - \lceil N_{RB}^{HO}/2 \rceil & N_{sb} > 1 \end{cases}$$

$$N_{RB}^{sb} \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 2 \end{cases}$$

$n_{VRB}$: obtained from scheduling grant
$N_{RB}^{HO}$: Pusch-HoppingOffset parameter, provided by higher layer signaling
$N_{sb}$: Number of subband
Functions related to hopping are given as Equation 2.

$$f_{hop}(i) = \begin{cases} 0 & N_{sb} = 1 \\ \left(f_{hop}(i-1) + \sum_{k=i\cdot 10+1}^{i\cdot 10+9} c(k) \times 2^{k-(i\cdot 10+1)}\right) \bmod N_{sb} & N_{sb} = 2 \\ \left(f_{hop}(i-1) + \left(\sum_{k=i\cdot 10+1}^{i\cdot 10+9} c(k) \times 2^{k-(i\cdot 10+1)}\right) \bmod (N_{sb}-1) + 1\right) \bmod N_{sb} & N_{sb} > 2 \end{cases}$$ [Equation 2]

$$f_m(i) = \begin{cases} i \bmod 2 & N_{sb} = 1 \text{ and intra \& inter subframe hopping} \\ \text{CURRENT\_TX\_NB} \bmod 2 & N_{sb} = 1 \text{ and inter-subframe hopping} \\ c(i \cdot 10) & N_{sb} > 1 \end{cases}$$

$f_{hop}(i)$: Hopping function
$f_m(i)$: Function for determining whether to use mirroring, (0 or 1)

A PUSCH hopping procedure of a UE is configured as follows. Hopping is performed when 1 bit of a FH (frequency hopping) field of a DCI format 0 of PDCCH is set to 1 and a type of uplink resource block allocation corresponds to 0. Hopping is divided into a type 1 and a type 2. A procedure of determining the types is shown in Equation 3.

$$N_{RB}^{PUSCH} = \begin{cases} N_{RB}^{UL} - \tilde{N}_{RB}^{HO} - (N_{RB}^{UL} \bmod 2) & \text{Type 1 PUSCH hopping} \\ N_{RB}^{UL} & \text{Type 2 } N_{sb} = 1 \text{ PUSCH hopping} \\ N_{RB}^{UL} - \tilde{N}_{RB}^{HO} & \text{Type 2 } N_{sb} > 1 \text{ PUSCH hopping} \end{cases}$$ [Equation 3]

The aforementioned LTE PUSCH hopping scheme can be modified as follows to determine an SA transmission frequency resource of D2D communication.

First of all, as mentioned in the foregoing description, in case of LTE PUSCH hopping, hopping can be performed in every subframe unit (or a slot unit). Yet, in order to indicate an SA transmission resource of D2D communication, it may be able to apply a hopping pattern to every TxOP corresponding to a time domain resource.

And, according to one embodiment of the present invention, it may be able to separately use the aforementioned hopping bandwidth with restriction according to an attribute of a TX UE and/or an RX UE (e.g., TA, cell size, Tx power, service type). For example, it may be able to restrict a UE including an attribute 1 and a UE including an attribute 2 to perform hopping only in a lower half band and an upper half band, respectively. If an Rx UE is aware of the attributes, the Rx UE is able to perform monitoring in a restricted bandwidth only, thereby enhancing Rx processing or power saving.

A Tx UE can receive all or a part of the parameter in advance via RRC or SIB. The Tx UE is able to use the parameter in determining a time-frequency transmission resource. This is because a transmission resource varies according to the attribute.

And, the attribute can be associated with such a parameter as PUSCH hopping, mirroring, re-indexing, and the like. For example, hopping and mirroring can be configured in a manner of being classified according to an attribute of a UE, a service attribute, timing advance, a power level, or the like. This makes reception of a UE to be simpler.

And, the count of retransmission/repetitive transmission can also be associated with a parameter of a PUSCH hopping formula. If the count of retransmission corresponds to 2 and 4, a partial parameter of the formula can be differently configured.

Or, a bandwidth itself can be separated from each other in a manner of being orthogonal to each other. Or, a bandwidth can be separated from each other in a TxOP subframe. Or, in case of 2, a start point may correspond to a different TxOP subframe rather than a first TxOP in a cycle. This is intended to uniformly allocate SA resources to each TxOP. A transmission resource pattern determined for a cycle may vary. In particular, the transmission resource pattern may change to a predetermined different pattern in a following cycle. This can be regarded as hopping is performed between patterns. For example, if there exist indexes for all patterns, hopping is applied between pattern indexes. A pattern may change according to a cycle index and may change in a manner of being interlocked with a subframe index.

The rule applied to the SA can also be used for determining a transmission resource pattern of data as it is. In particular, it is able to find out a transmission pattern of SA using an initial transmission value of the SA. It is able to identify an initial transmission location of data after the SA is decoded. Besides, a pattern for retransmission/repetitive transmission is able to identify a time and frequency position using PUSCH formula. And, it may be able to use the aforementioned rule with reference to FIGS. 24 to 26.

Meanwhile, the PUSCH formula can be restricted to a location of frequency domain of the SA only. A time domain pattern can be determined by a separate signal (RPT). The time domain pattern (RPT) can be used for indicating a TxOP and a practical transmission subframe in a cycle interval or a cycle. In this case, the proposed scheme using the PUSCH hopping formula can be restricted to the usage of indicating frequency domain only.

FIG. 28 is a diagram for explaining a device configured to perform the aforementioned operation.

A wireless device 800 shown in FIG. 28 corresponds to a specific UE 1 (Tx UE) of the aforementioned description and a wireless device 850 may correspond to a different specific UE 2 (Rx UE) of the aforementioned description. And, if the UE 1 performs communication with an eNB, the wireless device 850 may correspond to the eNB.

A UE 1 can include a processor 810, a memory 820, and a transceiver 830. A UE 2 850 can include a processor 860, a memory 870, and a transceiver 880. The transceiver 830/880 is configured to transmit/receive a radio signal and can be executed in a physical layer. The processor 810/860 is executed in a physical layer and/or an MAC layer and is connected with the transceiver 830/880. The processor 810/860 can perform the aforementioned interference control procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an embodiment is performed by software, the above-described method may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention can be applied to various wireless systems supporting direct communication between wireless devices.

What is claimed is:

1. A method for a transmission user equipment (Tx UE) to transmit a signal to a reception user equipment (Rx UE) in a wireless communication system supporting device-to-device (D2D) communication, the method comprising:
receiving resource allocation information related to the D2D communication from an eNB;
transmitting one or more sets of control information (SA) for the D2D communication and corresponding data to the Rx UE based on the resource allocation information received from the eNB,
wherein a time domain location at which the one or more sets of SA and corresponding data are transmitted comprises a prescribed time domain pattern based on the resource allocation information received from the eNB,
wherein the transmitting comprises determining a frequency domain location at which the one or more sets of SA and a frequency domain location at which the corresponding data are transmitted by:
(1) a first type hopping pattern determined by $N^{UL}_{RB}$-$N^{HO}$-($N^{UL}_{RB}$ mod 2), or
(2) a second type hopping pattern determined by $N^{UL}_{RB}$-$N^{HO}$, or by $N^{UL}_{RB}$,
wherein the $N^{UL}_{RB}$ corresponds to the to a number of frequency domain resource blocks capable of being used for transmitting the one or more sets of SA and corresponding data, and
wherein the $N^{HO}$ corresponds to a first hopping parameter.

2. The method of claim 1, further comprising:
changing the first type hopping pattern and the second type hopping pattern of the frequency domain locations at which the one or more sets of SA and corresponding data are transmitted in every subframe corresponding to a transmission opportunity according to the prescribed time domain pattern.

3. The method of claim 1, wherein the $N^{UL}_{RB}$ is determined according to a UE attribute of the Tx UE or the Rx UE.

4. The method of claim 3, wherein the UE attribute is determined based on at least one selected from the group consisting of a TA (timing advance) value, a cell size, transmit power, and a service type of a corresponding UE.

5. The method of claim 1, further comprising:
receiving radio resource control (RRC) signaling from the eNB,
wherein the $N^{HO}$ is determined based on a value received via the RRC signaling.

6. The method of claim 1, wherein whether to apply the first type hopping pattern or the second type hopping pattern is differently determined according to at least one UE attribute of the Tx UE and the Rx UE.

7. The method of claim 1, wherein, for each of the one or more sets of SA and corresponding data, the frequency domain location at which the data corresponding to the SA is transmitted is determined according to a predetermined rule based on the frequency domain location at which the SA is transmitted.

8. The method of claim 7, wherein, for each of the one or more sets of SA and corresponding data, if an index of a resource block of the frequency domain location at which the SA is transmitted corresponds to a first RB index and an index of a resource block of the frequency domain location at which the data corresponding to the SA is transmitted corresponds to a second RB index, the second RB index corresponds to an integer multiple of the first RB index.

9. A transmission UE (Tx UE, D2D UE) operating in a wireless communication system supporting device-to-device (D2D) communication, the D2D UE comprising:
a transceiver; and
a processor configured to:
control the transceiver to receive resource allocation information related to the D2D communication from an eNB,
control the transceiver to transmit one or more sets of control information (SA) for the D2D communication and corresponding data to the Rx UE based on the resource allocation information received from the eNB,
wherein a time domain location at which one or more of the one or more sets of SA and corresponding data are transmitted comprises a prescribed time domain pattern based on the resource allocation information received from the eNB, and
wherein the processor is configured to determine a frequency domain location at which the one or more sets of SA and a frequency domain location at which the corresponding data are transmitted by:
(1) a first type hopping pattern determined by $N^{UL}_{RB}$-$N^{HO}$-($N^{UL}_{RB}$ mod 2), or
(2) a second type hopping pattern determined by $N^{UL}_{RB}$-$N^{HO}$, or by $N^{UL}_{RB}$,
wherein the $N^{UL}_{RB}$ corresponds to a number of frequency domain resource blocks capable of being used for transmitting the one or more sets of SA and corresponding data are, and wherein the $N^{HO}$ corresponds to a first hopping parameter.

10. The D2D UE of claim 9, wherein the processor is configured to change the first type hopping pattern and the second type hopping pattern of the frequency domain locations at which the one or more sets of SA and corresponding data are transmitted in every subframe corresponding to a transmission opportunity according to the prescribed time domain pattern.

11. The D2D UE of claim 9, wherein the $N^{UL}_{RB}$ is determined according to a UE attribute of the Tx UE or the Rx UE.

12. The D2D UE of claim 11, wherein the UE attribute is determined based on at least one selected from the group consisting of a TA (timing advance) value, a cell size, transmit power, and a service type of a corresponding UE.

13. The D2D UE of claim 9,
wherein the processor is configured to control the transceiver to further receive radio resource control (RRC) signaling from the eNB,
wherein the $N^{HO}$ is determined based on a value received via the RRC signaling.

14. The D2D UE of claim 9, wherein whether to apply the first type hopping pattern or the second type hopping pattern is differently determined according to at least one UE attribute of the Tx UE and the Rx UE.

15. The D2D UE of claim 9, wherein, for each of the one or more sets of SA and corresponding data, the frequency domain location at which the data corresponding to the SA is transmitted is determined according to a predetermined rule based on the frequency domain location at which the SA is transmitted.

16. The D2D UE of claim 9, wherein, for each of the one or more sets of SA and corresponding data, if an index of a resource block of the frequency domain location at which the SA is transmitted corresponds to a first RB index and an index of a resource block of the frequency domain location at which the data corresponding to the SA is transmitted corresponds to a second RB index, the second RB index corresponds to an integer multiple of the first RB index.

* * * * *